(12) United States Patent
Kawakami et al.

(10) Patent No.: US 8,741,449 B2
(45) Date of Patent: *Jun. 3, 2014

(54) ANTHRACENE DERIVATIVE, LIGHT-EMITTING MATERIAL, MATERIAL FOR LIGHT-EMITTING ELEMENT, COMPOSITION FOR COATING, LIGHT-EMITTING ELEMENT, LIGHT-EMITTING DEVICE, AND ELECTRONIC DEVICE

(75) Inventors: Sachiko Kawakami, Kanagawa (JP); Nobuharu Ohsawa, Kanagawa (JP); Satoshi Seo, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,913

(22) Filed: Jun. 8, 2012

(65) Prior Publication Data

US 2012/0241728 A1 Sep. 27, 2012

Related U.S. Application Data

(63) Continuation of application No. 12/425,026, filed on Apr. 16, 2009, now Pat. No. 8,202,632.

(30) Foreign Application Priority Data

Apr. 24, 2008 (JP) ................. 2008-114062

(51) Int. Cl.
*H01L 51/54* (2006.01)

(52) U.S. Cl.
USPC ........... 428/690; 428/917; 313/504; 313/505; 313/506; 564/26; 564/426; 564/434; 257/40; 257/E51.05; 257/E51.026; 257/E51.032; 585/27

(58) Field of Classification Search
USPC .................. 428/690, 917; 313/504, 505, 506; 564/426, 434, 26; 585/27; 257/40, 257/E51.05, E51.026, E51.032
See application file for complete search history.

(56) References Cited

U.S. PATENT DOCUMENTS 7,674,914 B2 3/2010 Egawa et al.
7,723,722 B2 5/2010 Kawakami et al.
(Continued)

FOREIGN PATENT DOCUMENTS

EP    2 031 036 A1    3/2009
EP    2 364 964 A1    9/2011
(Continued)

OTHER PUBLICATIONS

European Search Report re application No. EP 09004367.0, dated May 20, 2010.

*Primary Examiner* — Gregory Clark
(74) *Attorney, Agent, or Firm* — Husch Blackwell LLP

(57) ABSTRACT

An anthracene derivative represented by the general formula (G1) is provided. The anthracene derivative represented by the general formula (G1) is a novel anthracene derivative having a wide band gap. Further, the anthracene derivative has a large energy gap and can be very suitably used as a material for a light-emitting element which exhibits blue light emission.

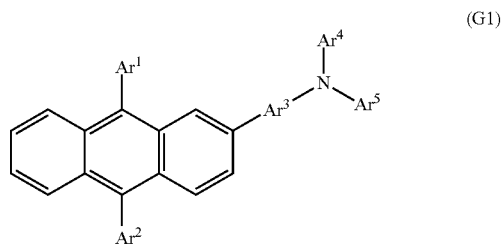

14 Claims, 21 Drawing Sheets

(56) References Cited

U.S. PATENT DOCUMENTS

| | | |
|---|---|---|
| 7,842,945 B2 | 11/2010 | Egawa et al. |
| 7,880,019 B2 | 2/2011 | Egawa et al. |
| 7,965,032 B2 | 6/2011 | Bae et al. |
| 8,101,289 B2 | 1/2012 | Ushikubo et al. |
| 2005/0095455 A1 | 5/2005 | Nomura et al. |
| 2005/0116633 A1 | 6/2005 | Yamazaki et al. |
| 2006/0292394 A1 | 12/2006 | Iwaki et al. |
| 2007/0049778 A1 | 3/2007 | Nomura et al. |
| 2007/0075632 A1 | 4/2007 | Kawakami et al. |
| 2007/0152572 A1 | 7/2007 | Kawakami et al. |
| 2007/0205412 A1* | 9/2007 | Bae et al. .................. 257/40 |
| 2008/0017853 A1 | 1/2008 | Egawa et al. |
| 2008/0107918 A1 | 5/2008 | Egawa et al. |
| 2008/0114178 A1 | 5/2008 | Kawakami et al. |
| 2008/0268284 A1 | 10/2008 | Kawakami et al. |
| 2008/0286445 A1 | 11/2008 | Suzuki et al. |
| 2009/0004506 A1 | 1/2009 | Nomura et al. |
| 2009/0058278 A1* | 3/2009 | Ushikubo et al. ............. 313/504 |
| 2009/0085479 A1 | 4/2009 | Ushikubo |
| 2009/0102366 A1 | 4/2009 | Ushikubo et al. |
| 2009/0174321 A1 | 7/2009 | Osaka et al. |
| 2009/0247795 A1 | 10/2009 | Kawakami |
| 2009/0253916 A1 | 10/2009 | Kawakami et al. |
| 2009/0267498 A1 | 10/2009 | Kawakami et al. |
| 2012/0211728 A1 | 8/2012 | Ushikubo et al. |

FOREIGN PATENT DOCUMENTS

| | | | |
|---|---|---|---|
| EP | 2 444 470 A1 | 4/2012 | |
| JP | 2003-146951 * | 5/2003 | ............ C07C 211/61 |
| JP | 2004-95850 | 3/2004 | |
| JP | 2006-41103 | 2/2006 | |
| JP | 5355962 B2 | 11/2013 | |
| WO | WO 2007/102683 A1 | 9/2007 | |
| WO | WO 2010/114253 A2 | 10/2010 | |

\* cited by examiner

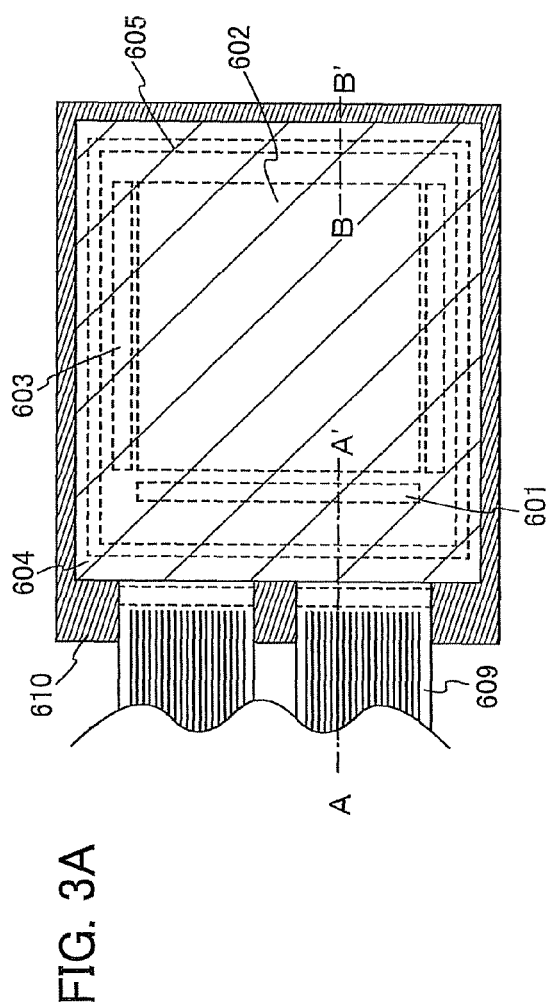
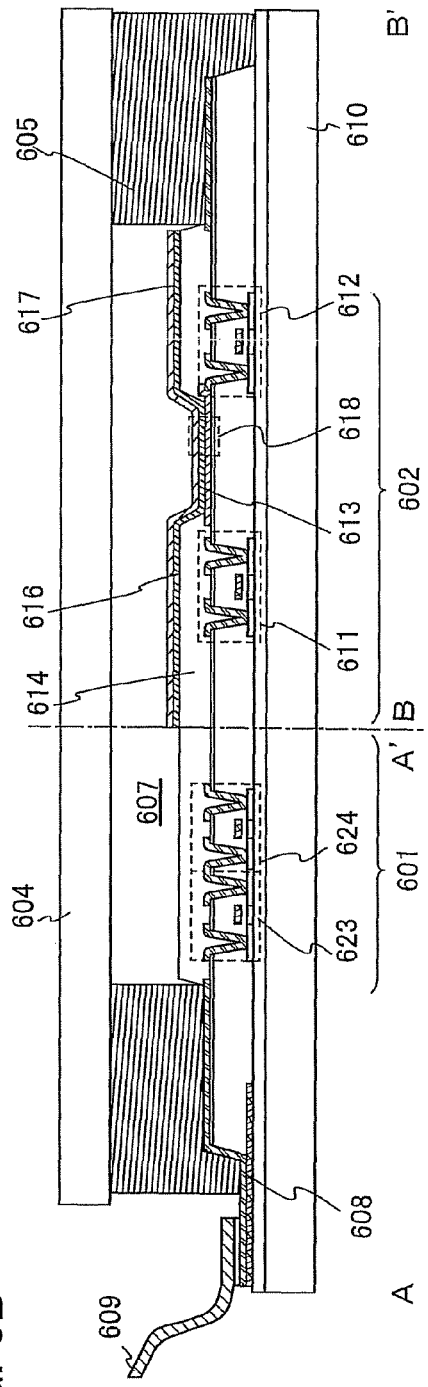
FIG. 3A
FIG. 3B

ANTHRACENE DERIVATIVE, LIGHT-EMITTING MATERIAL, MATERIAL FOR LIGHT-EMITTING ELEMENT, COMPOSITION FOR COATING, LIGHT-EMITTING ELEMENT, LIGHT-EMITTING DEVICE, AND ELECTRONIC DEVICE

This application is a continuation of application serial no. 12/425,026 filed on Apr. 16, 2009 now U.S. Pat. No. 8,202,632.

BACKGROUND OF THE INVENTION

1. Field of the Invention

The present invention relates to an anthracene derivative. In addition, the present invention relates to a light-emitting material, a material for a light-emitting element, a composition for coating, light-emitting element, a light-emitting device, and an electronic device each of which uses the anthracene derivative.

2. Description of the Related Art

A display device using a light-emitting element in which an organic compound is used as a light-emitting substance (an organic EL element) has been developed rapidly as a next generation display device because it has advantages such as thinness, lightness in weight, high response speed, and low power consumption. Although there have been various obstacles, technique has been improved as far as organic EL televisions have become commercially available recently.

In an organic EL element, when voltage is applied between a pair of electrodes which interpose a light-emitting layer containing a light-emitting organic compound, electrons and holes are injected from the electrodes and are recombined to form an excited state, and when the excited state returns to a ground state, light is emitted. A wavelength of light emitted from a light-emitting substance is peculiar to the light-emitting substance; thus, by using different types of organic compounds as light-emitting substances, light-emitting elements which exhibit various wavelengths, i.e., various colors can be obtained.

In the case of a display device which is expected to display images, such as a display, at least three colors of light, i.e., red, green, and blue are required in order to reproduce full-color images. To achieve this, for example, there are following methods: a method in which a light-emitting element emitting light with a light-emitting spectrum in a wide wavelength and a color filter are combined, a method in which a light-emitting element emitting light with a shorter wavelength than the wavelength of a desired color and a color conversion layer are combined, a method in which a light-emitting element emitting light with a desired wavelength is used. Among those three methods, the final one, i.e., a method in which a desired wavelength is obtained directly is preferable because loss in energy is small if the method is used.

This method is adapted to the organic EL televisions which have become commercially available; however, in addition to that method, a color filter is used in practice, and a micro cavity structure is employed for a light-emitting element in order to improve color purity. Organic EL televisions have got many advantages but are naturally expected to provide high quality images as next generation televisions, and light-emitting elements exhibiting an appropriate emission color are required to live up to the expectation.

Light emitted from a light-emitting substance is peculiar to the substance as described above. There are many measures to improve the color purity of an organic EL television, which means that a light-emitting element which exhibits light emission of a favorable color and also satisfies other important requirements of lifetime, power consumption, and the like is very difficult to obtain. In addition, important characteristics of a light-emitting element, such as a lifetime or power consumption, do not always depend on only a substance exhibiting light emission. The characteristics are greatly affected also by layers other than a light-emitting layer, an element structure, a relationship between a light-emitting substance and a host, or the like. Therefore, there is no doubt that many kinds of materials for light-emitting elements are needed for the growth in this field. Accordingly, materials having various molecular structures for light-emitting elements have been proposed (For example, see Patent Document 1: Japanese Published Patent Application No. 2003-146951).

SUMMARY OF THE INVENTION

As for light-emitting elements that are currently developed, there is a problem such that light-emitting elements that emit blue light are inferior in characteristics to light-emitting elements that emit red light to green light. In order to emit blue light, a light-emitting substance having a large energy gap is necessary and a substance used for a host in which the light-emitting substance is dispersed or a substance used for a transporting layer adjacent to a light-emitting region in a light-emitting layer needs to have a larger energy gap, which is one cause of the above problem.

Therefore, according to an embodiment of the present invention, a novel anthracene derivative with large energy gap is provided.

As a result of diligent studies, the present inventors have succeeded in synthesis of an anthracene derivative in which a triarylamine skeleton is bonded only to the 2-position of 9,10-diarylanthracene, as a substance with a large band gap which can be suitably used as a material for a light-emitting element.

In other words, an anthracene derivative according to the present invention is represented by the general formula (G1) shown below.

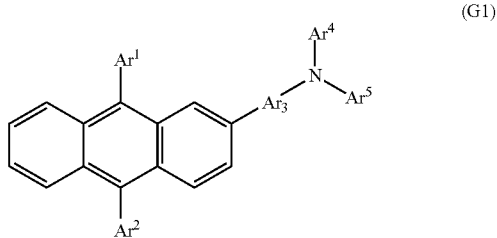

(G1)

Note that in the formula, $Ar^1$ and $Ar^2$ independently represent an aryl group having 6 to 13 carbon atoms in a ring, $Ar^3$ represents an arylene group having 6 to 13 carbon atoms in a ring, and $Ar^4$ and $Ar^5$ independently represent an aryl group having 6 to 13 carbon atoms in a ring. In addition, $Ar^1$, $Ar^2$, $Ar^3$, $Ar^4$, and $Ar^5$ may independently have a substituent and two or more of the substituents may be bonded to each other to form a ring which may have a spiro ring structure.

As $Ar^1$ or $Ar^2$ in the formula, groups represented by the structural formulae (1-1) to (1-16) shown below are specifically given. Note that $Ar^1$ and $Ar^2$ may be the same group or different groups.

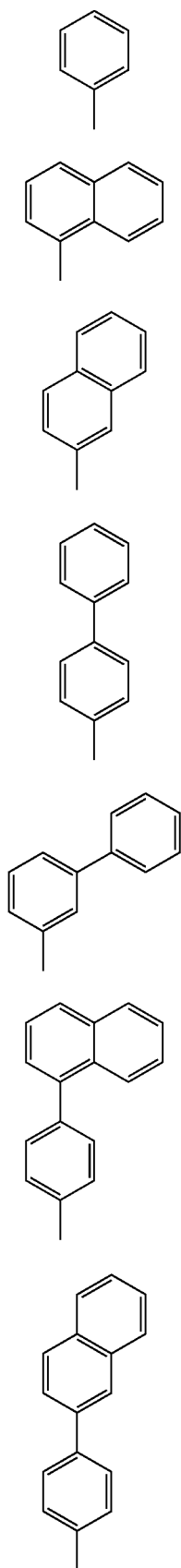
(1-1)
(1-2)
(1-3)
(1-4)
(1-5)
(1-6)
(1-7)
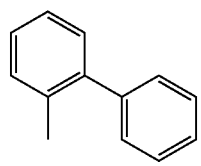
(1-8)
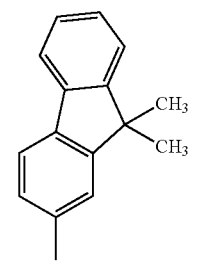
(1-9)
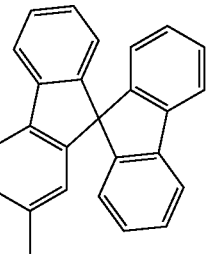
(1-10)
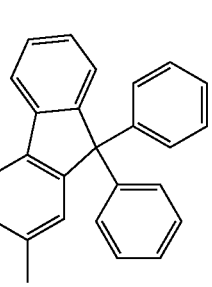
(1-11)
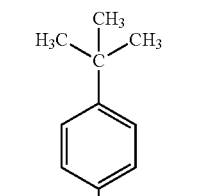
(1-12)
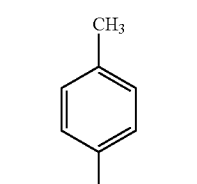
(1-13)
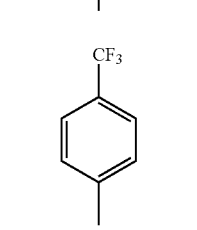
(1-14)

(1-15)
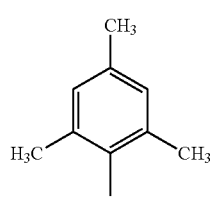
(1-16)
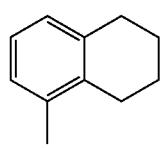
As Ar³ in the formula, groups represented by the structural formulae (2-1) to (2-11) shown below are specifically given.
(2-1)
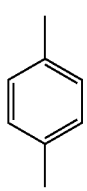
(2-2)
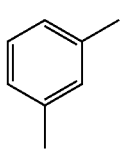
(2-3)
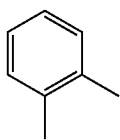
(2-4)
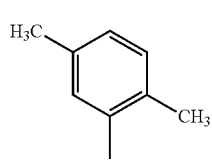
(2-5)
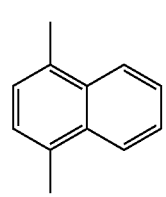
(2-6)
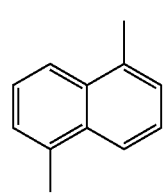
(2-7)
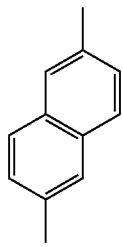
(2-8)
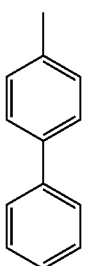
(2-9)
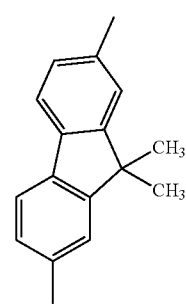
(2-10)
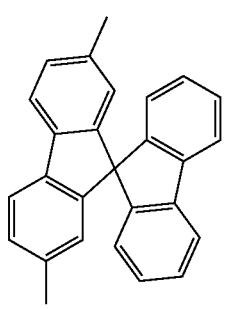
(2-11)
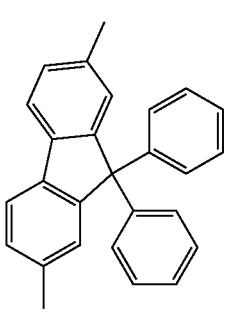
As Ar⁴ and Ar⁵ in the formula, groups represented by the structural formulae (3-1) to (3-16) shown below are specifically given. Note that Ar⁴ and Ar⁵ may be the same group or different groups.

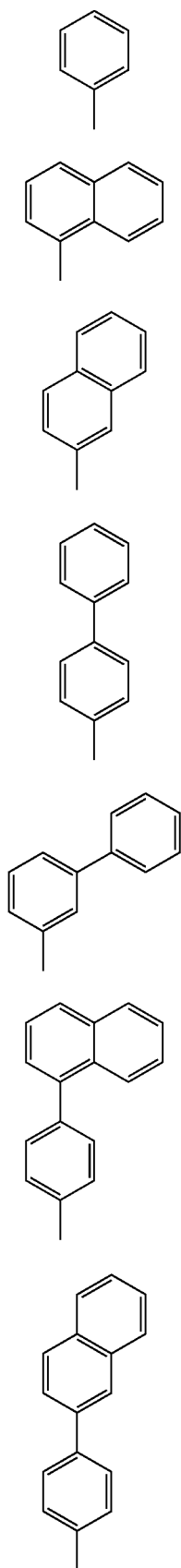
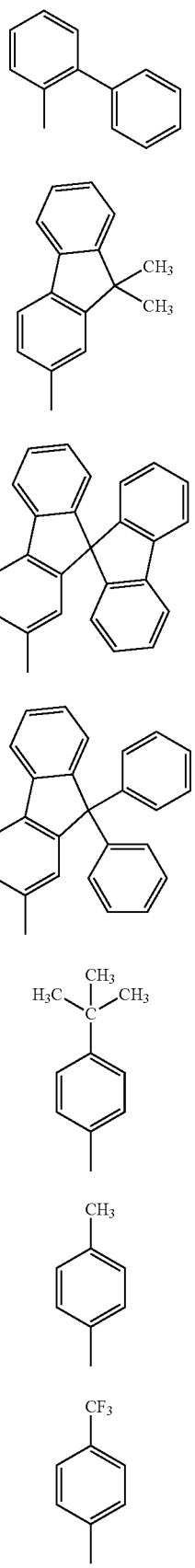

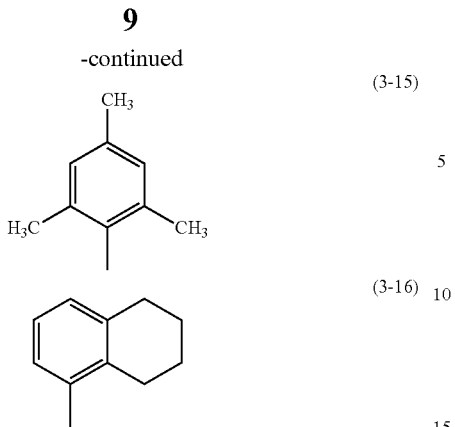

(3-15)

(3-16)

An anthracene derivative of the present invention having the foregoing structure is a novel anthracene derivative having a wide band gap. An anthracene derivative of the present invention has a large energy gap and can be very suitably used as a material for a light-emitting element which exhibits blue light emission. In addition, the anthracene derivative of the present invention has a wide band gap and therefore can be suitably used as a host in a light-emitting layer.

BRIEF DESCRIPTION OF THE DRAWINGS

FIGS. 3A and 3B are conceptual diagrams of an active matrix light-emitting device.

DETAILED DESCRIPTION OF THE INVENTION

Figure 1A:
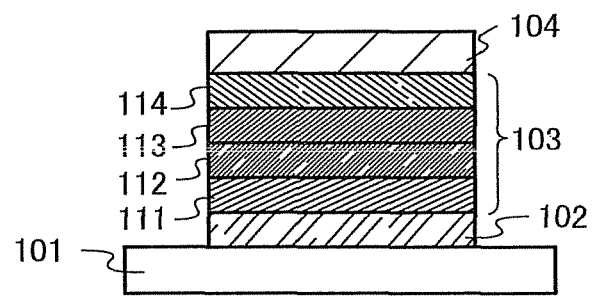
FIGS. 1A and 1B are conceptual diagrams of light-emitting elements.

Hereinafter, embodiments of the present invention will be described. However, the present invention can be implemented with various modes and it will be readily appreciated by those who skilled in the art that modes and details can be modified in various ways without departing from the spirit and the scope of the present invention. Accordingly, the present invention should not be construed as being limited to the description of the embodiments to be given below.

(Embodiment 1)

An anthracene derivative of the present invention has a molecular structure in which a triarylamine skeleton is bonded to the 2-position of 9,10-diarylanthracene. Note that the triarylamine skeleton may have a substituent. An anthracene derivative having such a structure of this embodiment has a large energy gap and can be very suitably used as a material for a light-emitting element which exhibits blue light emission. In addition, the anthracene derivative of the present invention has a wide band gap and therefore can also be suitably used as a host in a light-emitting layer. Further, the anthracene derivative of the present invention has a triarylamine skeleton and therefore can also be suitably used for a hole-transporting layer.

The above-described anthracene derivative of this embodiment can be represented by the general formula (G1) shown below.

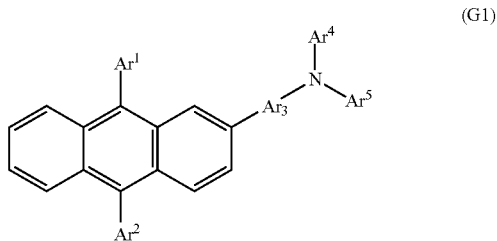

(G1)

$Ar^1$ and $Ar^2$ in the formula independently represent An Aryl group having 6 to 13 carbon atoms in a ring. In specific, a phenyl group, a naphthyl group, a fluorenyl group, and the like are given. Note that $Ar^1$ and $Ar^2$ may independently have another substituent; in such a case, an alkyl group having 1 to 4 carbon atoms or an aryl group having 6 to 13 carbon atoms in a ring can be given as the substituent. In specific, a methyl group, an ethyl group, a propyl group, a butyl group, a phenyl group, a naphthyl group, a fluorenyl group, and the like are given. Further, $Ar^1$ and $Ar^2$ may include a substituent or substituents and two or more of the substituents may be bonded to each other to form a ring which may have a spiro ring structure.

Specific examples of the groups represented by $Ar^1$ or $Ar^2$ are represented by the structural formulae (1-1) to (1-16) shown below.

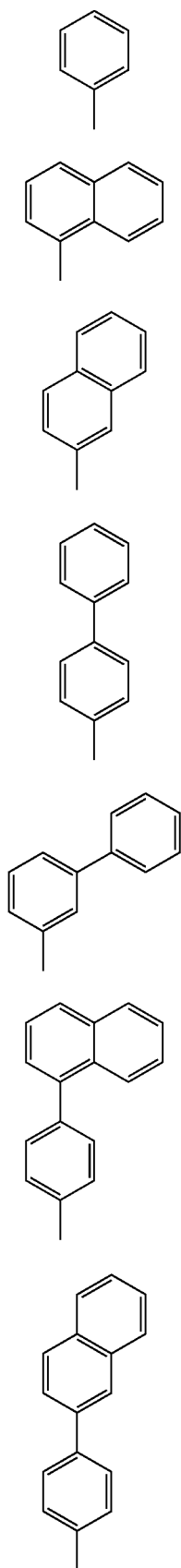
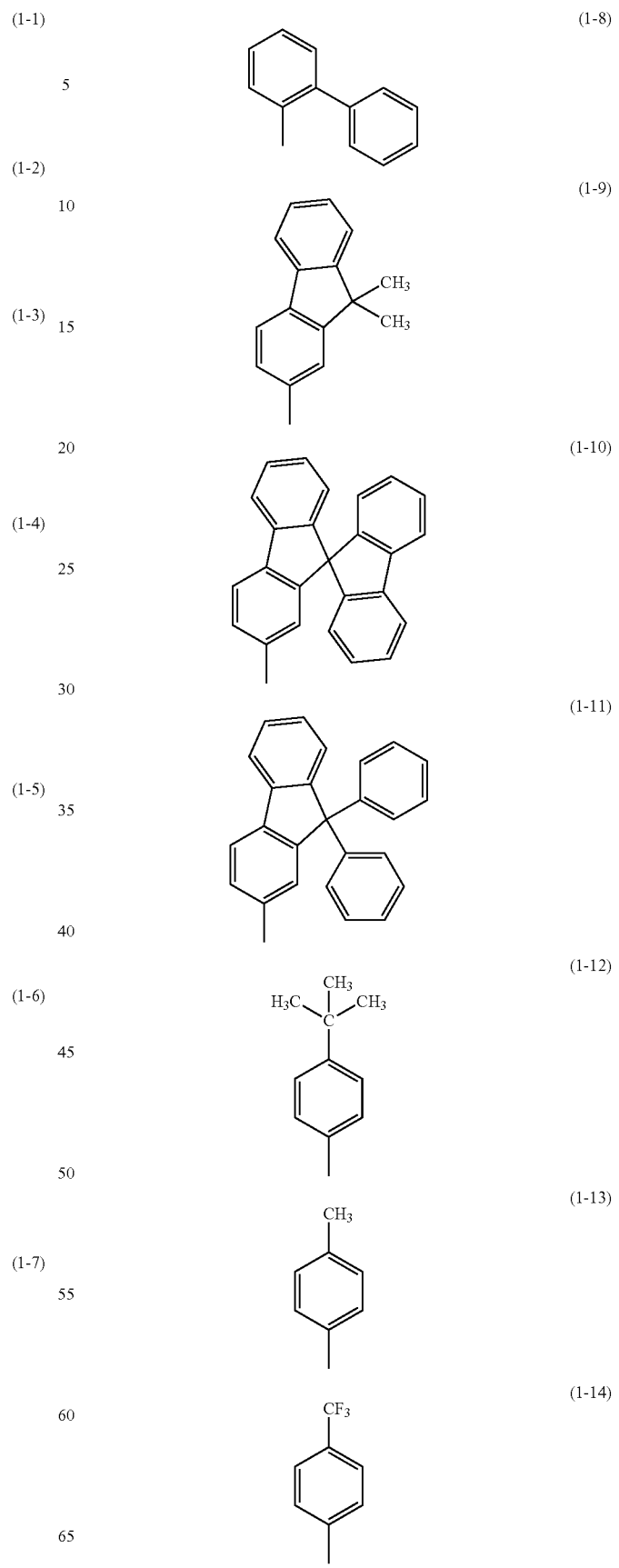

(1-15)

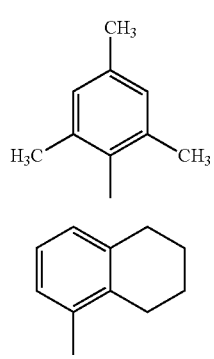

(1-16)

Ar³ in the formula represents an arylene group having 6 to 13 carbon atoms in a ring. In specific, a phenylene group, a naphthylene group, a florene-diyl group, and the like are given. Further, Ar³ may include a substituent or substituents and two or more of the substituents may be bonded to each other to form a ring which may have a spiro ring structure.

As Ar³ in the formula, groups represented by the structural formulae (2-1) to (2-11) shown below can be specifically given.

(2-1)
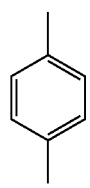

(2-2)

(2-3)

(2-4)
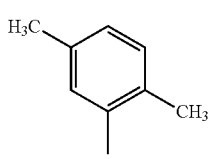

(2-5)
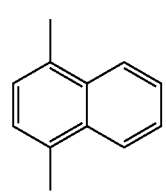

(2-6)
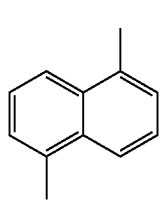

(2-7)
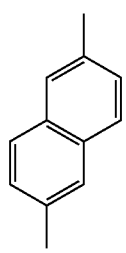

(2-8)

(2-9)
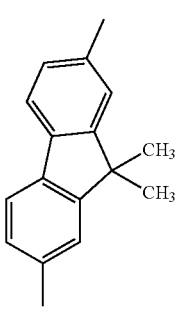

(2-10)
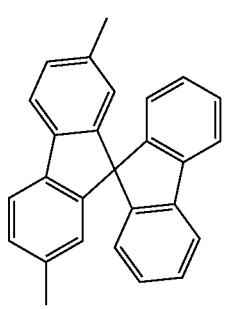

(2-11)
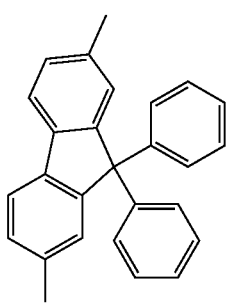
As Ar⁴ or Ar⁵ in the formula, groups represented by the structural formulae (3-1) to (3-16) shown below can be specifically given. Note that Ar⁴ and Ar⁵ may be the same group or different groups.
(3-1)
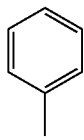
(3-2)
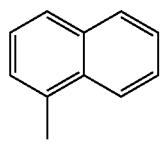
(3-3)
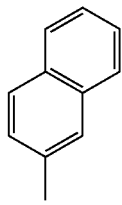
(3-4)
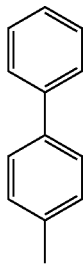
(3-5)
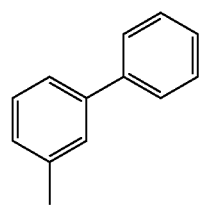
(3-6)
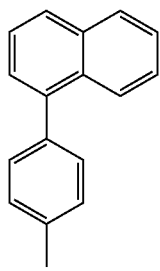
(3-7)
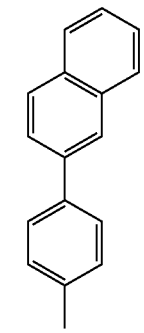
(3-8)
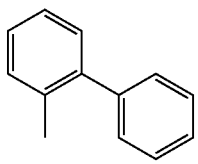
(3-9)
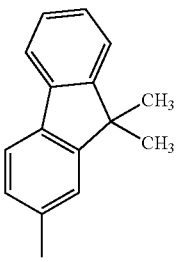
(3-10)
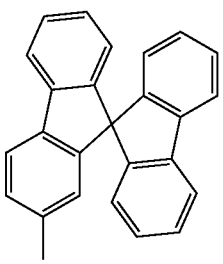
(3-11)
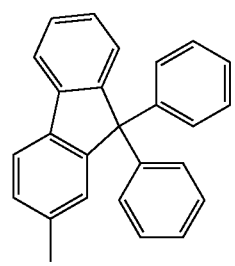

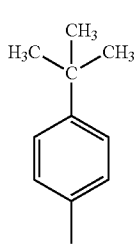

(3-12)

(3-13)

(3-14)

(3-15)

(3-16)

Among the anthracene derivatives represented by the general formula (G1), an anthracene derivative represented by the general formula (G11) shown below, in which Ar$^3$ is a phenylene group, is preferable because of simplicity of the synthesis. Note that in the formula, Ar$^1$ and Ar$^2$ independently represent an aryl group having 6 to 13 carbon atoms in a ring, and Ar$^4$ and Ar$^5$ independently represent an aryl group having 6 to 13 carbon atoms in a ring. In addition, Ar$^1$, Ar$^2$, Ar$^4$, and Ar$^5$ may independently have a substituent, and two or more of the substituents may be bonded to each other to form a ring which may have a spiro ring structure.

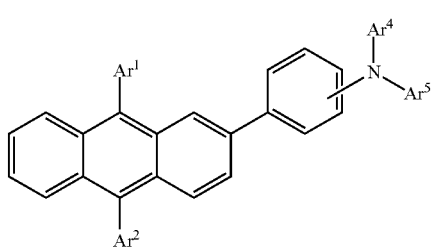

(G11)

Further, among the anthracene derivatives represented by the general formula (G11), an anthracene derivative in which a phenyl group is employed as an aryl group which is directly bonded to the nitrogen in the amine skeleton is preferable in consideration of the energy gap of the anthracene derivative. Therefore, the structure represented by the general formula (G12) shown below, in which each of Ar$^4$ and Ar$^5$ is a phenyl group, is more preferable. Note that Ar$^1$ and Ar$^2$ in the formula may independently have a substituent and two or more of the substituents may be bonded to each other to form a ring which may have a spiro ring structure. In addition, two or more of substituents of R$^1$ to R$^{10}$ may be bonded to each other to faun a ring which may have a spiro ring structure.

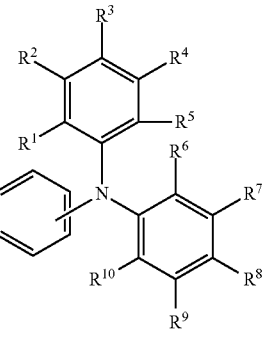

(G12)

Further, among the anthracene derivatives represented by the general formula (G12), an anthracene derivative in which the anthracene skeleton and the nitrogen in the amine skeleton are bonded to the phenylene group at the para positions is preferable in consideration of steric hindrance and the like. Therefore, the structure represented by the general formula (G13) shown below is more preferable. Note that Ar$^1$ and Ar$^2$ in the formula may independently have a substituent and two or more of the substituents may be bonded to each other to form a ring which may have a spiro ring structure. Any of R$^1$ to R$^5$ may be bonded to each other to form a ring Any of R$^6$ to R$^{10}$ may also be bonded to each other to form a ring. A ring formed by a bond between any of R$^1$ to R$^5$ or any of R$^6$ to R$^{10}$ have a spiro ring structure.

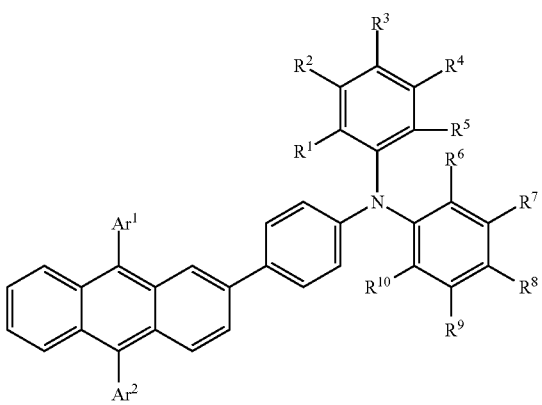

(G13)

Further, among the anthracene derivatives represented by the general formula (G13), an anthracene derivative in which each of Ar$^1$ and Ar$^2$ is a phenyl group is preferable in consideration of steric hindrance of Ar$^1$ and Ar$^2$ and simplicity of the synthesis. Therefore, the structure represented by the general formula (G14) shown below is more preferable. Note that R$^1$ to R$^{20}$ in the formula independently represent any one of hydrogen, an alkyl group having 1 to 4 carbon atoms, and an aryl group having 6 to 10 carbon atoms in a ring. Any of R$^1$ to $R^5$ may be bonded to each other to form a ring. Any of $R^6$ to $R^{10}$ may be bonded to each other to form a ring. Any of $R^{11}$ to $R^{15}$ may be bonded to each other to form a ring. Any of $R^{16}$ to $R^{20}$ may be bonded to each other to form a ring. A ring formed by a bond between any of $R^1$ to $R^5$, any of $R^6$ to $R^{10}$, any of $R^{11}$ to $R^{15}$, or any of $R^{16}$ to $R^{20}$ may have a spiro ring structure.

Further, among the anthracene derivatives represented by the general formula (G14), an anthracene derivative in which each of $R^1$ to $R^{20}$ hydrogen, which is a smaller substituent, is preferable in consideration of steric hindrance. Therefore, the structure represented by the structural formula (G15) shown below is more preferable.

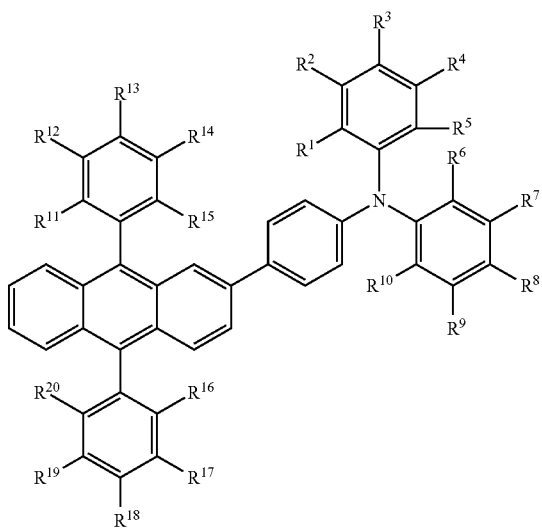

(G14)

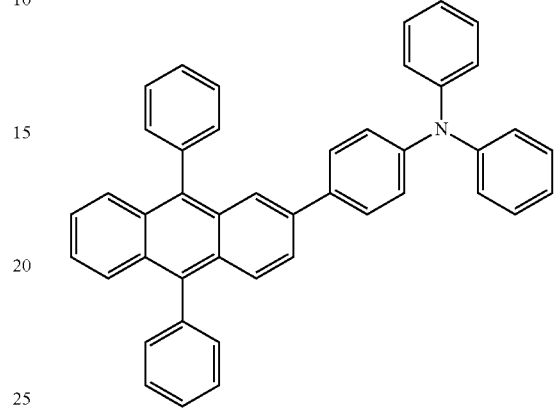

(G15)

As specific examples of the anthracene derivatives represented by the general formula (G1), the anthracene derivatives represented by the structural formulae (1) to (49) shown below are given. Note that the present invention is not limited to these examples.

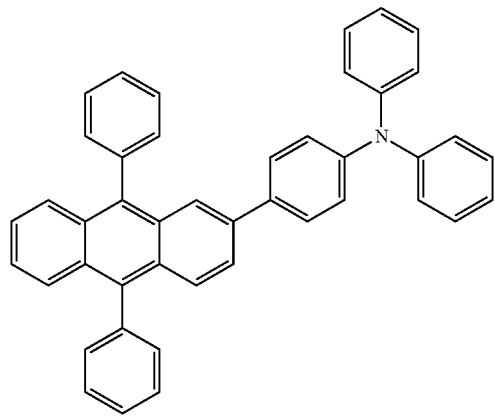

(1)

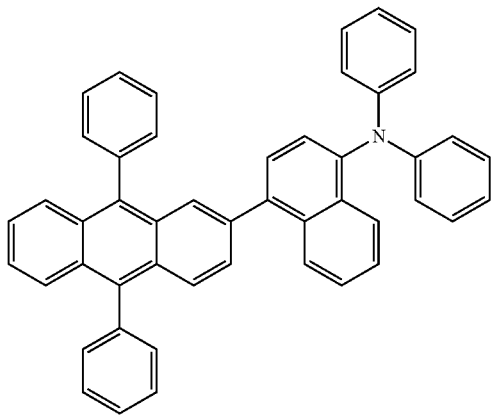

(2)

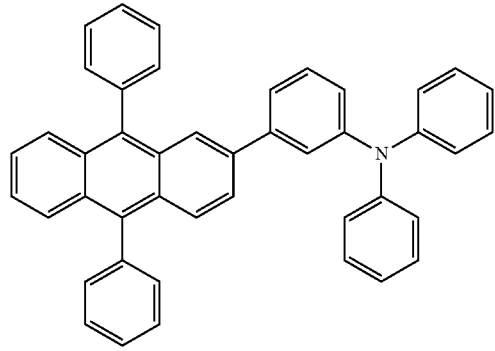

(3)

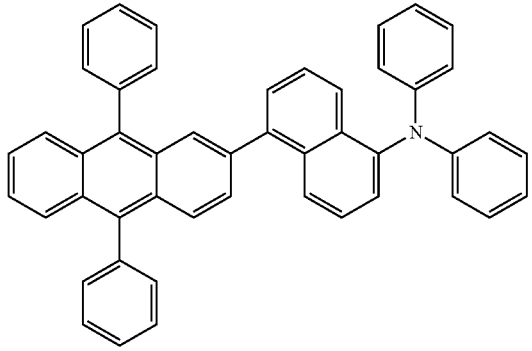

(4)

-continued
(5)
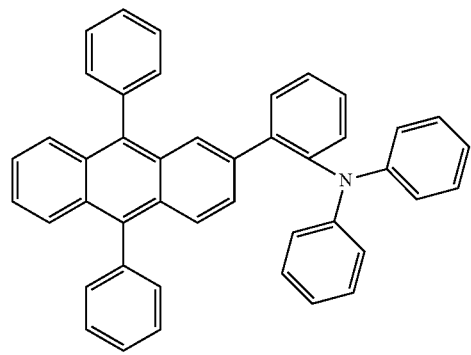
(6)
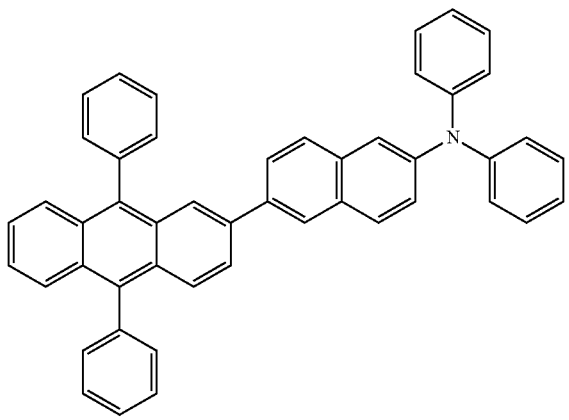
(7)
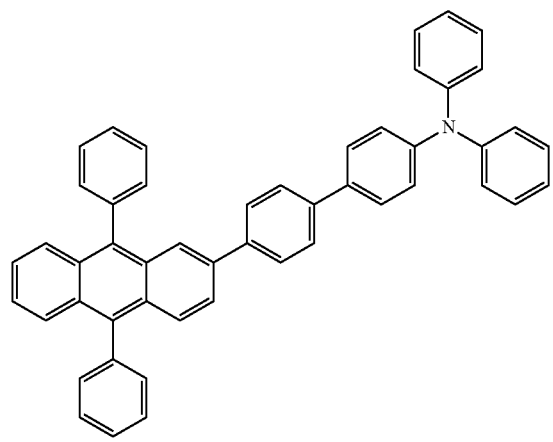
(8)
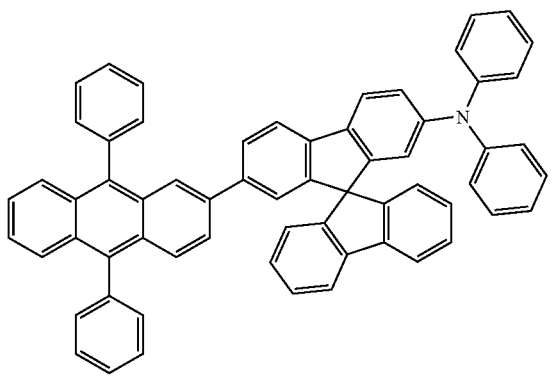
(9)
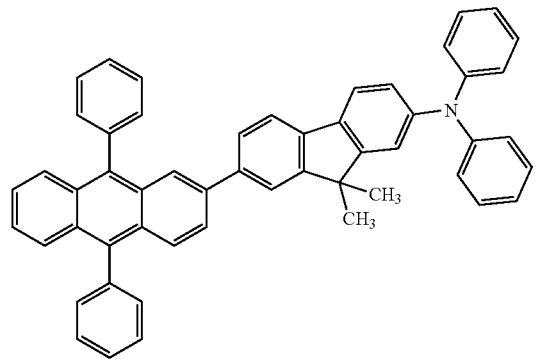
(10)
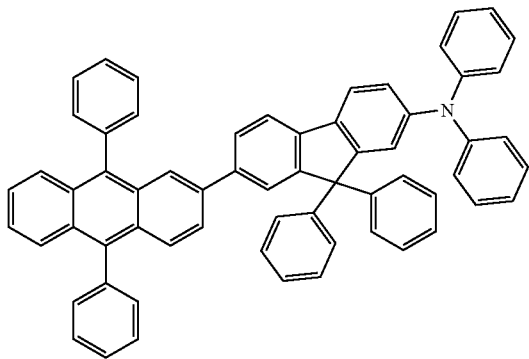

(11)
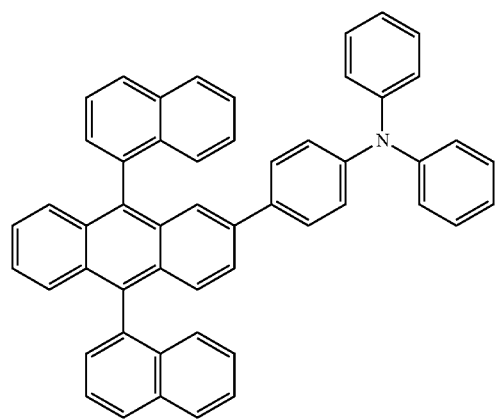
(12)
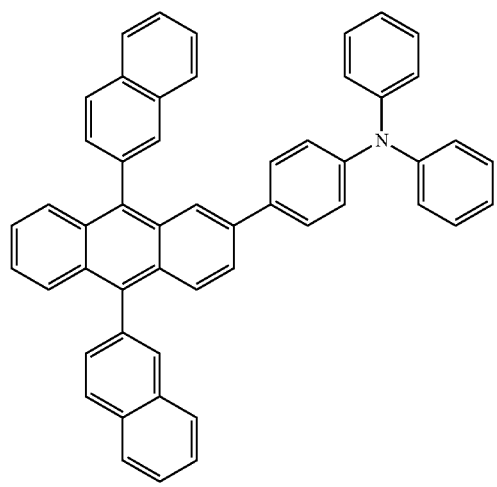
(13)
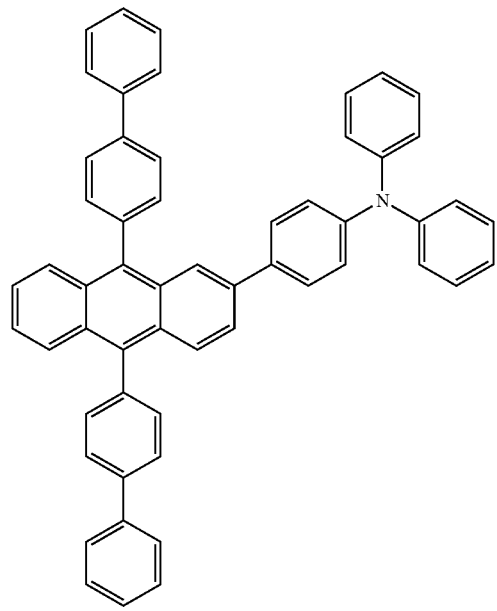
(14)
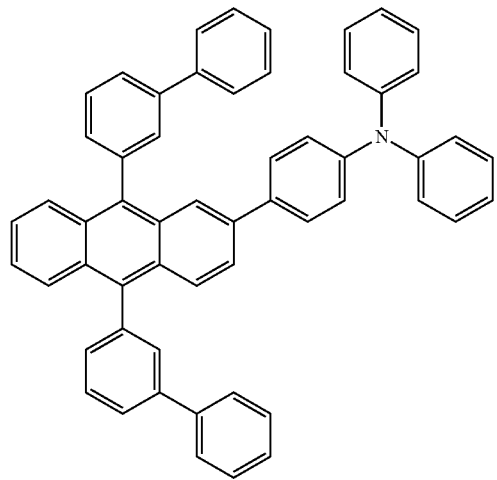

-continued
(15)
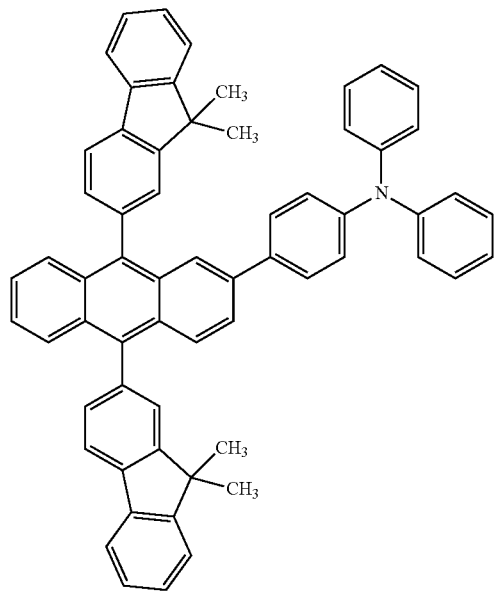
(16)
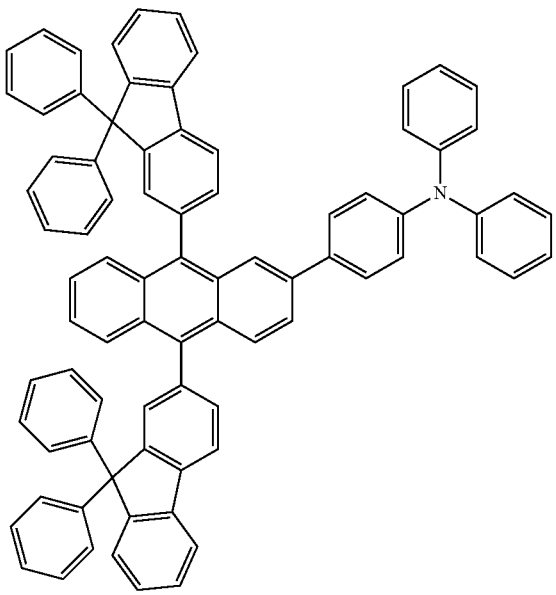
(17)
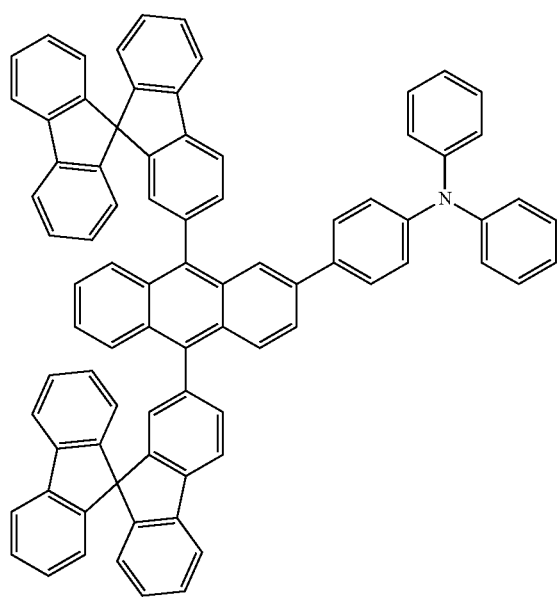
(18)
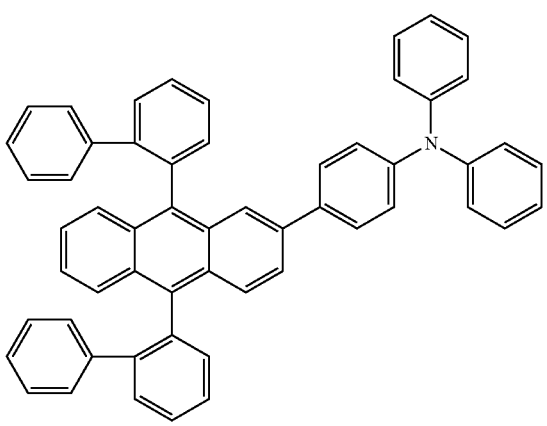

-continued
(19)
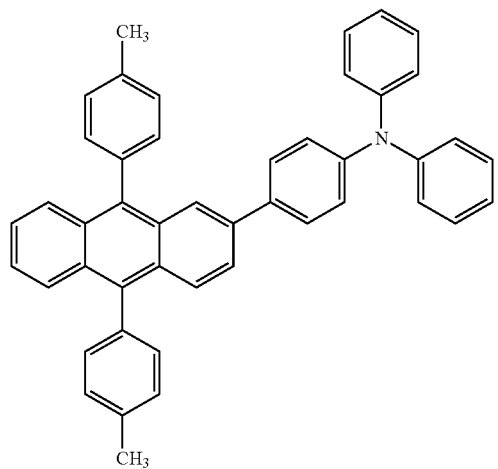
(20)
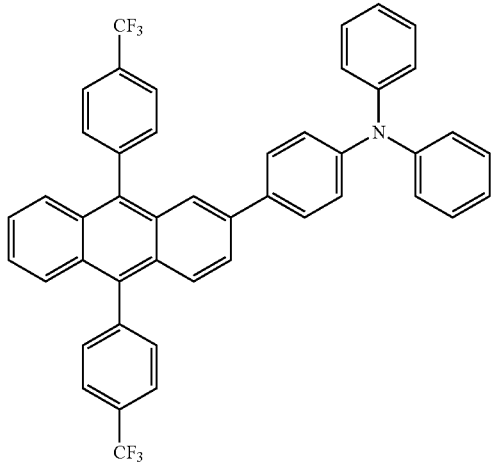
(21)
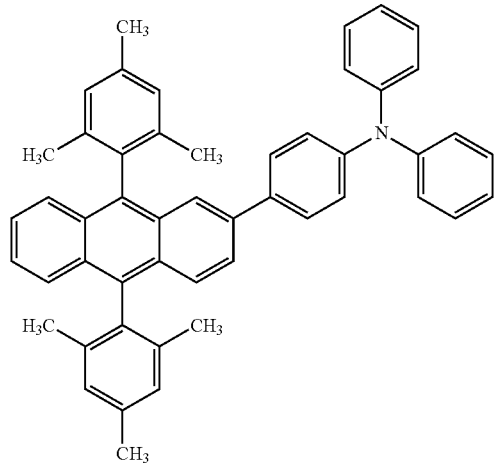
(22)
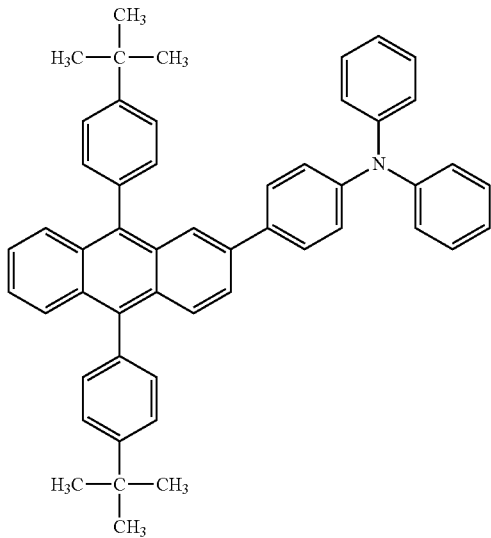
(23)
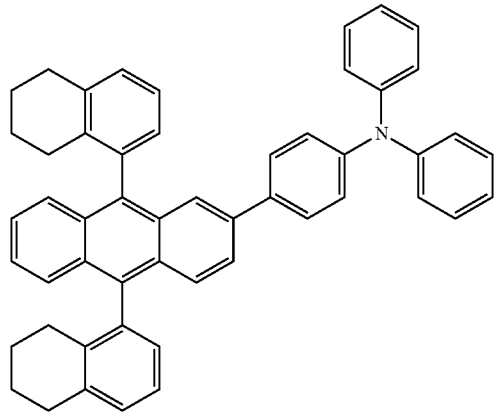
(24)
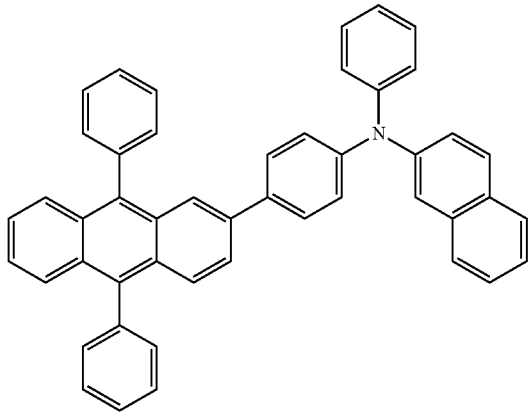

-continued
(25)
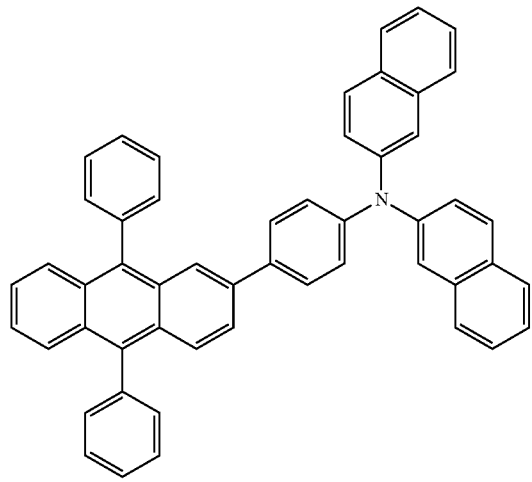
(26)
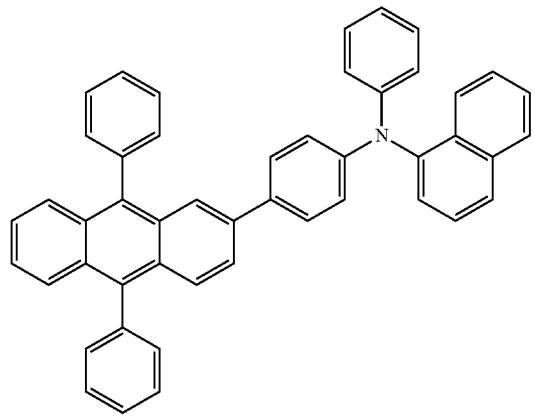
(27)
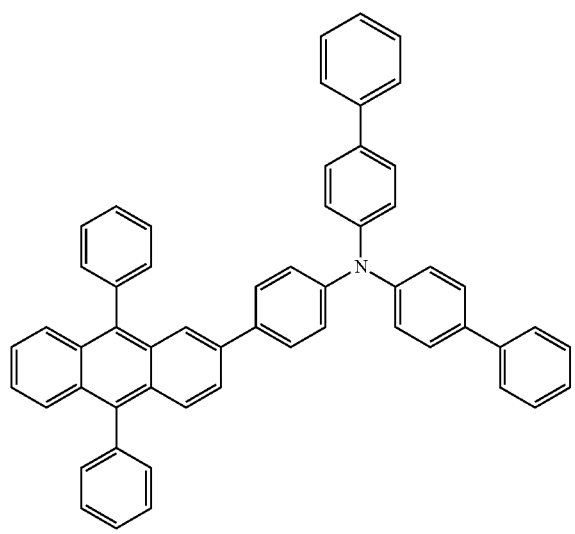
(28)
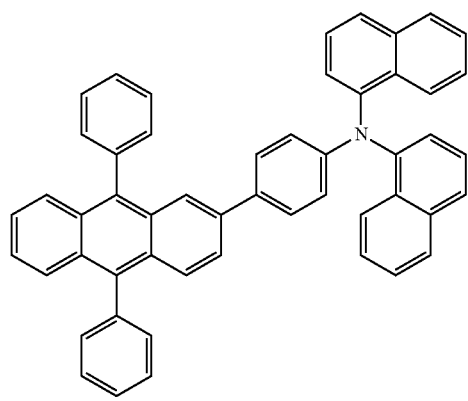
(29)
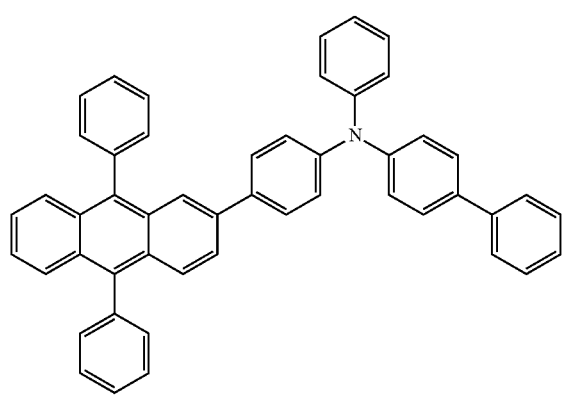
(30)
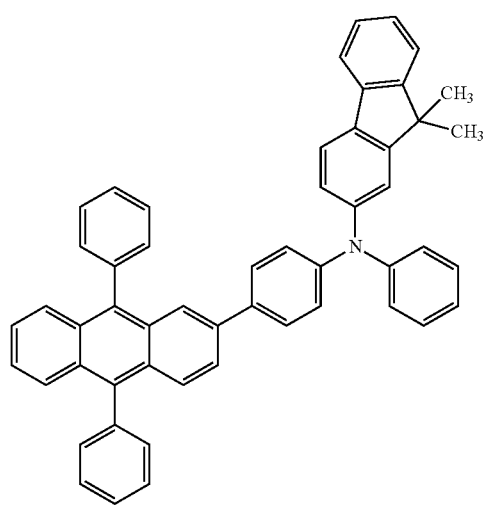

-continued
(31)
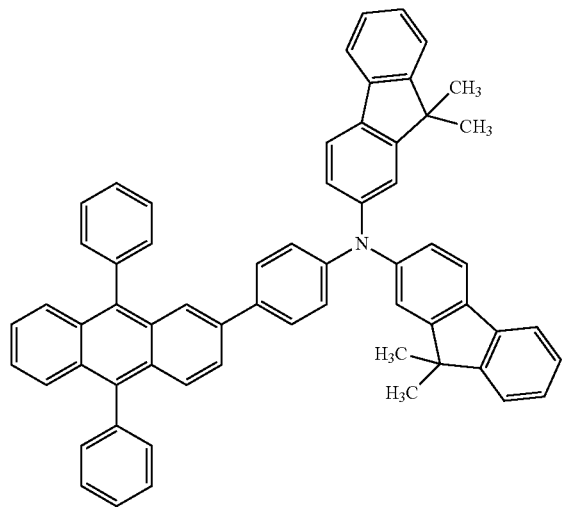
(32)
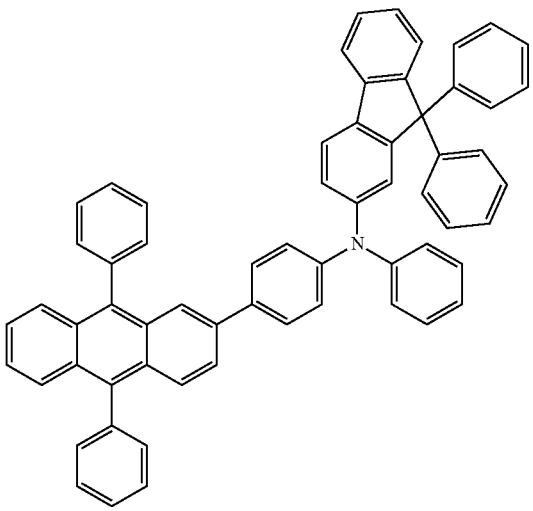
(33)
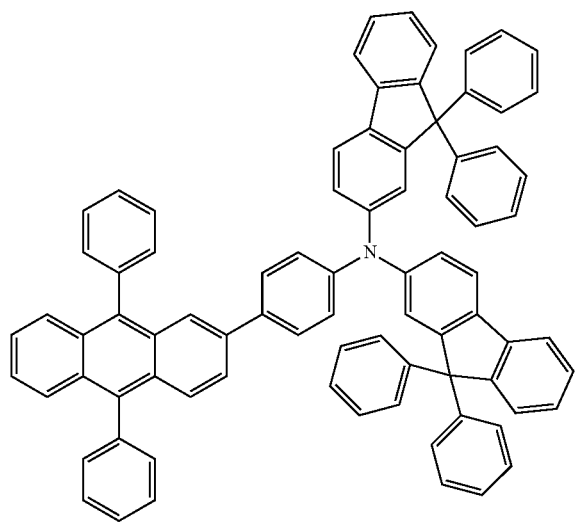
(34)
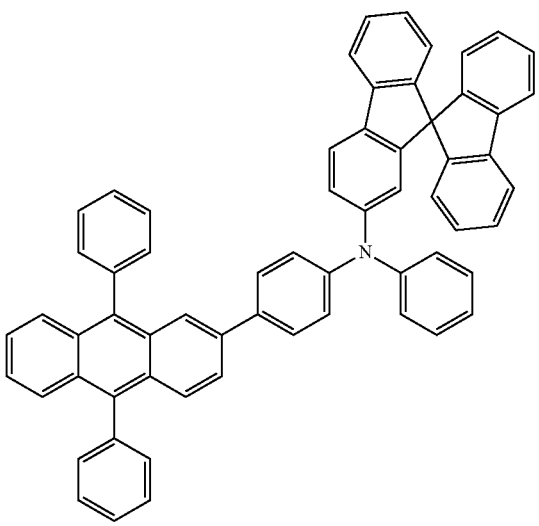
(35)
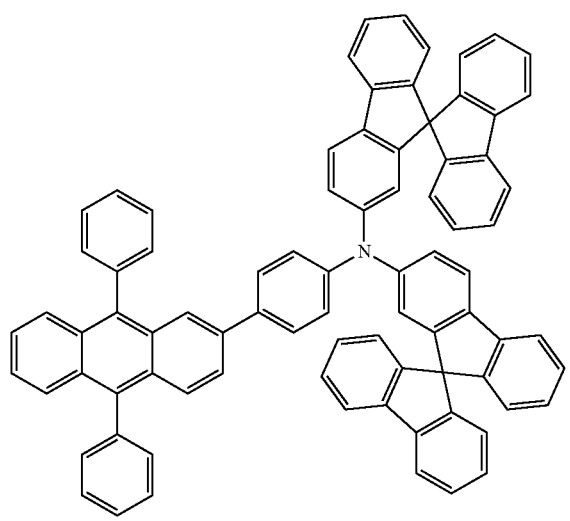
(36)
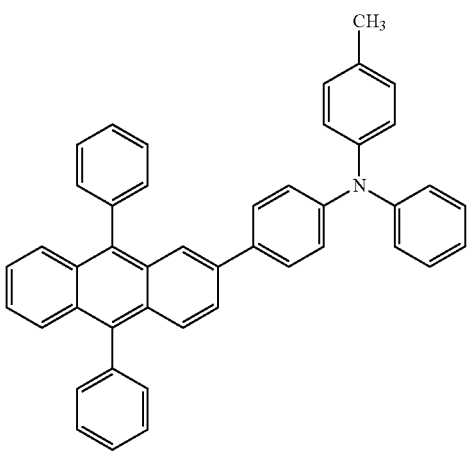

-continued
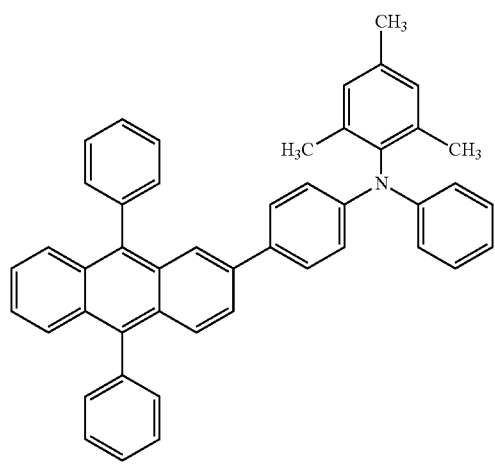
(37)
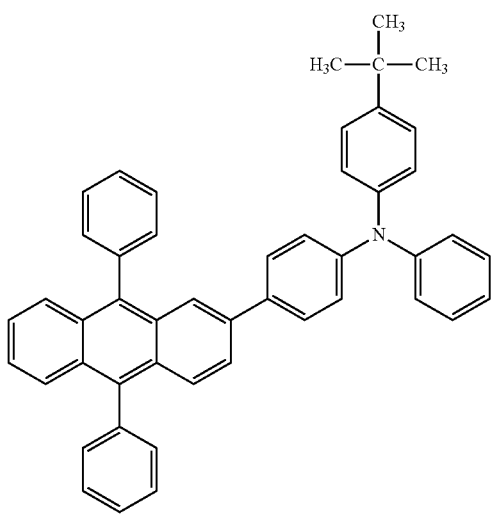
(38)
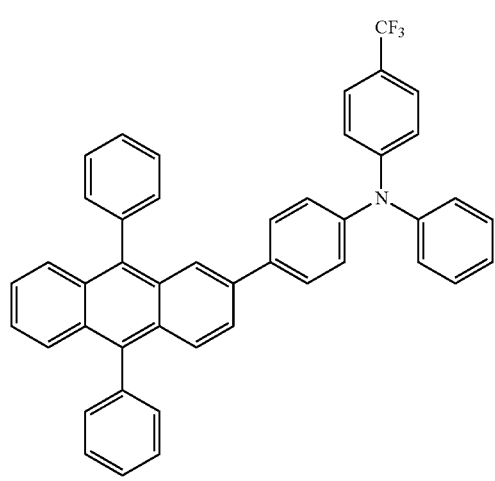
(39)
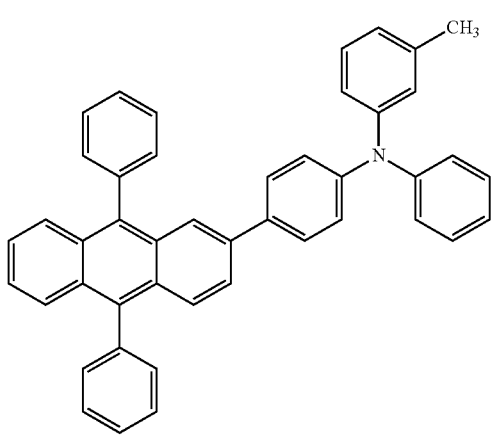
(40)
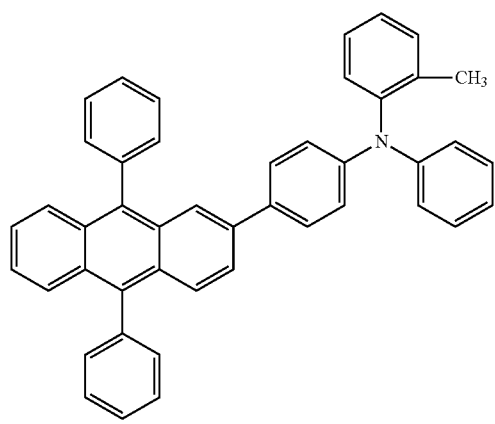
(41)
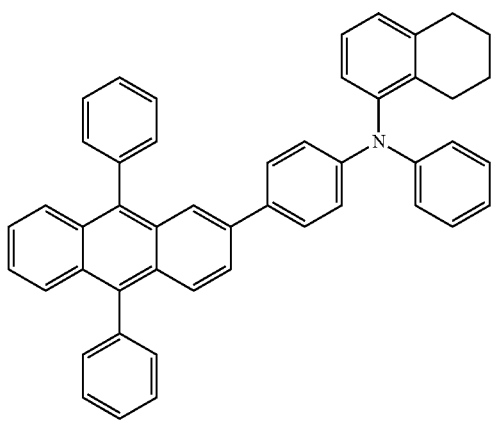
(42)

-continued
(43)
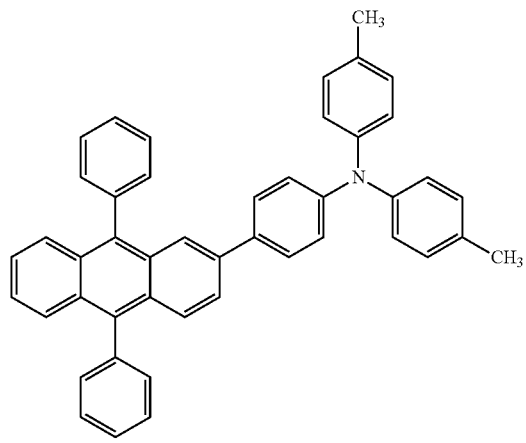
(44)
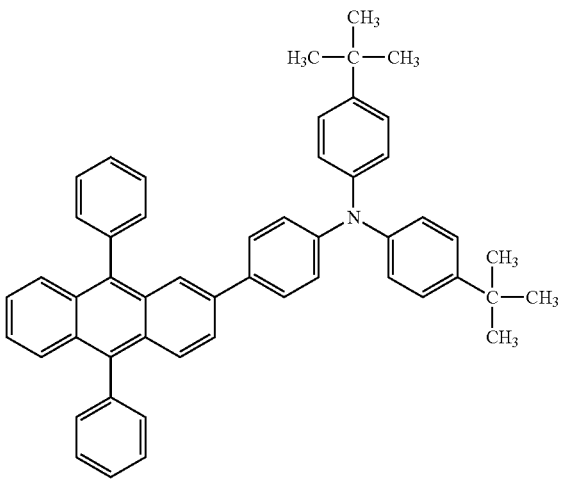
(45)
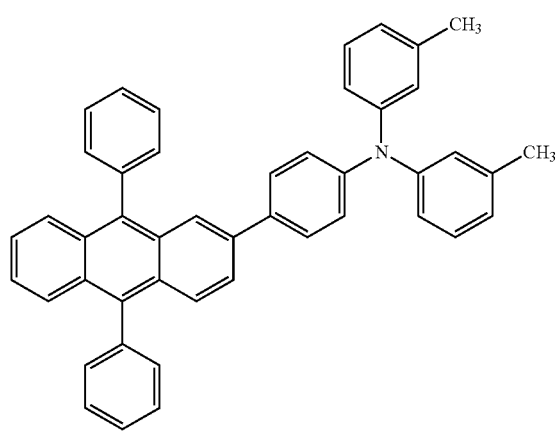
(46)
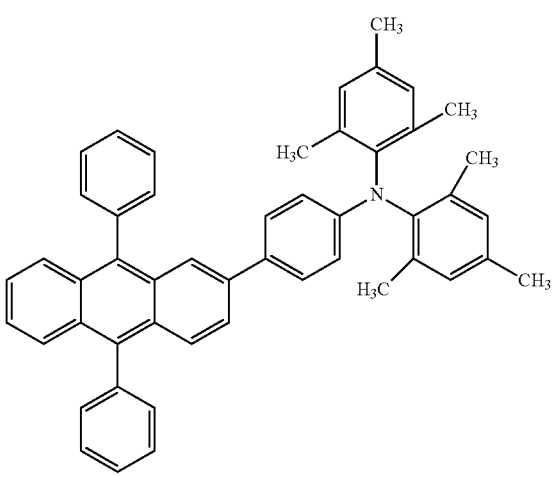
(47)
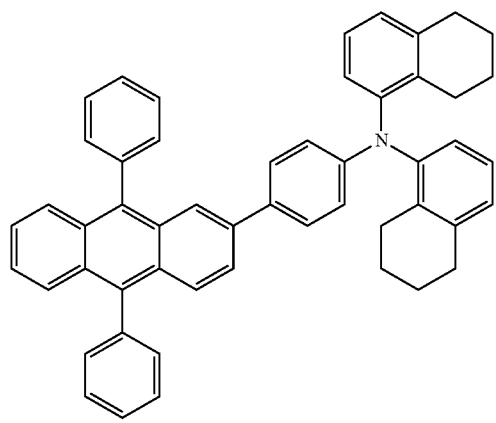
(48)
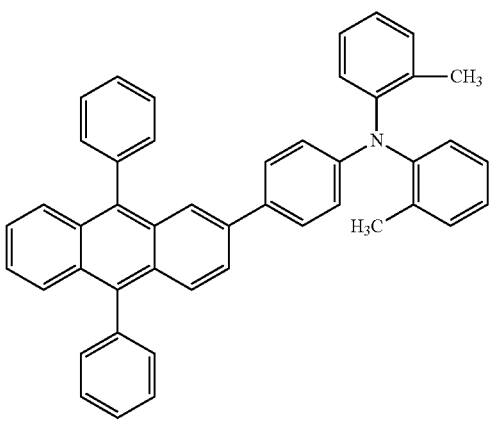

-continued (49)

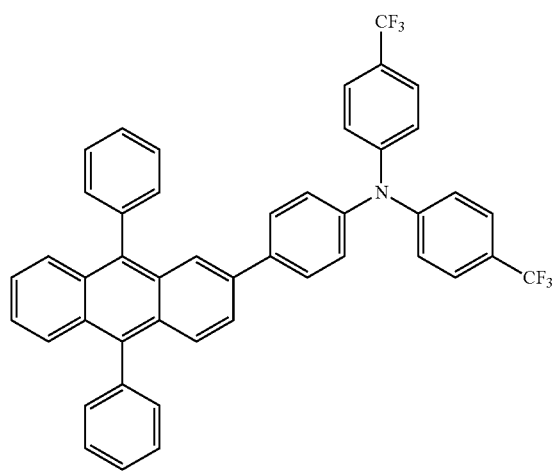

Next, a synthesis method of an anthracene derivative of this embodiment is described. A synthesis scheme of the anthracene derivative is given below.

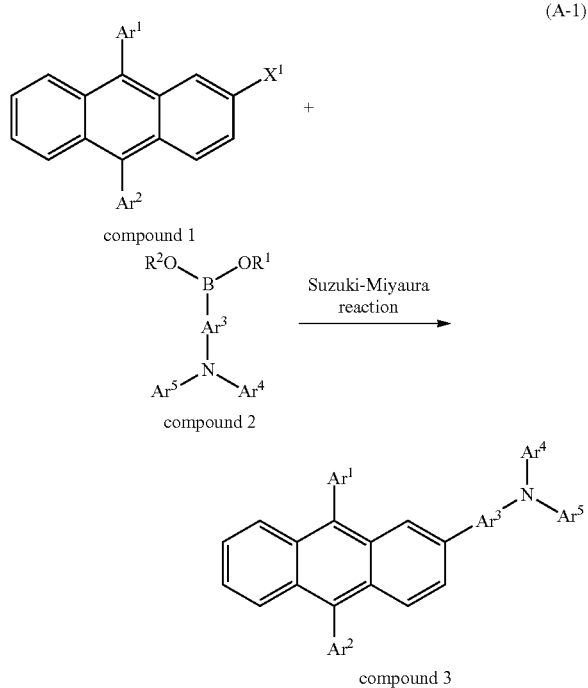

The anthracene derivative represented by the foregoing general formula (G1) this embodiment can be obtained as follows. An anthracene derivative (compound 1) and a triarylamine compound with a boronic acid or organoboron (compound 2) are coupled via Suzuki-Miyaura reaction as shown by the foregoing reaction formula (A-1), whereby an anthracene derivative having a triarylamine skeleton at the 2-position (compound 3), which is a target substance, can be obtained.

In the reaction formula (A-1), $X^1$ represents a halogen or a triflate group, $Ar^1$ and $Ar^2$ independently represent a substituted or unsubstituted aryl group having 6 to 13 carbon atoms, $Ar^3$ represent a substituted or unsubstituted arylene group having 6 to 13 carbon atoms, $Ar^4$ represent a substituted or unsubstituted aryl group having 6 to 13 carbon atoms, and $Ar^4$ represent a substituted or unsubstituted aryl group having 6 to 13 carbon atoms. If $X^5$ is a halogen, chlorine, bromine, or iodine is preferable.

Examples of a palladium catalyst that can be used in the foregoing reaction formula (A-1) include, but are not limited to, palladium(II) acetate and tetrakis(triphenylphosphine)palladium(0).

Examples of a ligand of the palladium catalyst that can be used in the foregoing reaction formula (A-1) include, but are not limited to, tri(ortho-tolyl)phosphine, triphenylphosphine, and tricyclohexylphosphine.

Examples of a base that can be used in the foregoing reaction formula (A-1) include, but are not limited to, an organic base such as sodium t-butoxide and an inorganic base such as potassium carbonate.

Examples of a solvent that can be used in the foregoing reaction formula (A-1) are as follows: a mixed solvent of toluene and water; a mixed solvent of toluene, alcohol such as ethanol, and water; a mixed solvent of xylene and water; a mixed solvent of xylene, alcohol such as ethanol, and water; a mixed solvent of benzene and water; a mixed solvent of benzene, alcohol such as ethanol, and water; and a mixed solvent of ether such as ethylene glycol dimethyl ether, and water. Note that a solvent that can be used is not limited thereto. Further, a mixed solvent of toluene and water or a mixed solvent of toluene, ethanol, and water is preferable.

As described above, an anthracene derivative of this embodiment can be synthesized.

The above-described anthracene derivative of this embodiment has a large energy gap and therefore can be very suitably used as a light emission center material of a light-emitting element which exhibits blue light emission or as a host material of a light-emitting element which exhibits blue to red light emission. In addition, the anthracene derivative has an anthracene skeleton, a very stable thermophysical property, and a large energy gap, and therefore, can also be very suitably used as a carrier transporting material.

(Embodiment 2)

One mode of a light-emitting element including the anthracene derivative of Embodiment 1 is described below with reference to FIG. 1A.

A light-emitting element of this embodiment has a plurality of layers between a pair of electrodes. In this embodiment, the light-emitting element includes a first electrode 102, a second electrode 104, and an EL layer 103 provided between the first electrode 102 and the second electrode 104. Note that in the following description in this embodiment, it is assumed that the first electrode 102 serves as an anode and that the second electrode 104 serves as a cathode. In other words, when voltage is applied to the first electrode 102 and the second electrode 104 so that the potential of the first electrode 102 is higher than that of the second electrode 104, light emission can be obtained.

A substrate 101 is used as a support of the light-emitting element. For example, glass, plastic, or the like can be used for the substrate 101. Any material other than those materials may be used as long as it functions as the support of the light-emitting element.

As the first electrode 102, a metal, an alloy, an electroconductive compound, a mixture thereof, or the like which has a high work function (specifically, 4.0 eV or more) is preferably used. Specifically, for example, indium tin oxide (ITO), indium tin oxide containing silicon or silicon oxide, indium zinc oxide (IZO), indium oxide containing tungsten oxide and zinc oxide (IWZO), and the like are given. Films of such a conductive metal oxide are typically formed by sputtering, but may be formed by applying a sol-gel method or the like. For example, a film of indium zinc oxide (IZO) can be formed by a sputtering method using a target in which zinc oxide is added to indium oxide at 1 wt % to 20 wt %. Further, a film of indium oxide containing tungsten oxide and zinc oxide (IWZO) can be formed by a sputtering method using a target in which tungsten oxide and zinc oxide are added to indium oxide at 0.5 wt % to 5 wt % and 0.1 wt % to 1 wt %, respectively. Further, gold (Au), platinum (Pt), nickel (Ni), tungsten (W), chromium (Cr), molybdenum (Mo), iron (Fe), cobalt (Co), copper (Cu), palladium (Pd), nitride of a metal material (e.g., titanium nitride), and the like can be used.

There is no particular limitation on a stack structure of the EL layer 103. The EL layer 103 may be formed by any appropriate combination of a layer containing the anthracene derivative of the present invention which is described in Embodiment 1, with a layer containing a substance having a high electron-transporting property, a layer containing a substance having a high hole-transporting property, a layer containing a substance having a high electron-injecting property, a layer containing a substance having a high hole-injecting property, a layer containing a bipolar substance (a substance having a high electron-transporting property and a high hole-transporting property), or the like. For example, the EL layer 103 can include an appropriate combination of a hole-injecting layer, a hole-transporting layer, a light-emitting layer, an electron-transporting layer, an electron-injecting layer, and the like. In this embodiment, the EL layer 103 has a structure in which a hole-injecting layer 111, a hole-transporting layer 112, a light-emitting layer 113, and an electron-transporting layer 114 are stacked in that order over the first electrode 102. Materials for forming each layer are specifically given below.

The hole-injecting layer 111 is a layer containing a substance with a high hole-injecting property. Molybdenum oxide, vanadium oxide, ruthenium oxide, tungsten oxide, manganese oxide, or the like can be used. Alternatively, the hole-injecting layer 111 can be formed using a phthalocyanine-based compound such as phthalocyanine (abbreviation: $H_2Pc$) or copper phthalocyanine (abbreviation: CuPc); an aromatic amine compound such as 4,4'-bis[N-(4-diphenylaminophenyl)-N-phenylamino]biphenyl (abbreviation: DPAB) or N,N'-bis[4-[bis(3-methylphenyl)amino]phenyl]-N,N'-diphenyl-[1,1'-biphenyl]-4,4'-diamine (abbreviation: DNTPD); a high molecule compound such as poly(ethylenedioxythiophene)/poly(styrenesulfonic acid) (PEDOT/PSS), or the like.

Alternatively, the hole-injecting layer 111 can be formed using a composite material in which an acceptor substance is contained in a substance having a high hole-transporting property. Note that by using the material having a high hole-transporting property which contains an acceptor material, a material for forming an electrode may be selected regardless of the work function. That is, as an alternative to a material having a high work function, a material having a low work function can be used for the first electrode 102. As the acceptor substance, 7,7,8,8-tetracyano-2,3,5,6-tetrafluoroquinodimethane (abbreviation: $F_4$-TCNQ), chloranil, and the like can be given. Further, a transition metal oxide can be given. Further, an oxide of metals that belong to Group 4 to Group 8 of the periodic table can be given. Specifically, vanadium oxide, niobium oxide, tantalum oxide, chromium oxide, molybdenum oxide, tungsten oxide, manganese oxide, and rhenium oxide are preferable because they have a high electron accepting property. Among them, molybdenum oxide is especially preferable because it is stable also in the atmosphere, has a low hygroscopic property, and can be easily handled.

As a substance having a high hole-transporting property which is used for the composite material, any of a variety of compounds such as aromatic amine compounds, carbazole derivatives, aromatic hydrocarbons, and high molecular compounds (such as oligomers, dendrimers, or polymers) can be used. The organic compound used for the composite material is preferably an organic compound having a high hole-transporting property. Specifically, a substance having a hole mobility of $1 \times 10^{-6}$ $cm^2/Vs$ or more is preferably used. Note that any substance other than the above substances may also be used as long as its hole-transporting property is higher than its electron-transporting property. Hereinafter, organic compounds that can be used for the composite material are specifically given.

As aromatic amine compounds, for example, there are N,N'-di(p-tolyl)-N,N'-diphenyl-p-phenylenediamine (abbreviation: DTDPPA), 4,4'-bis[N-(4-diphenylaminophenyl)-N-phenylamino]biphenyl (abbreviation: DPAB), N,N'-bis[4-[bis(3-methylphenyl)amino]phenyl]-N,N'-diphenyl-[1,1'-biphenyl]-4,4'-diamine (abbreviation: DNTPD), 1,3,5-tris[N-(4-diphenylaminophenyl)-N-phenylamino]benzene (abbreviation: DPA3B), and the like.

As carbazole derivatives which can be used for the composite material, specifically, there are 3-[N-(9-phenylcarbazol-3-yl)-N-phenylamino]-9-phenylcarbazole (abbreviation: PCzPCA1), 3,6-bis[N-(9-phenylcarbazol-3-yl)-N-phenylamino]-9-phenylcarbazole (abbreviation: PCzPCA2), and 3-[N-(1-naphthyl)-N-(9-phenylcarbazol-3-yl)amino]-9-phenylcarbazole (abbreviation: PCzPCN1).

As other examples of carbazole derivatives which can be used for the composite material, there are 4,4'-di(N-carbazolyl)biphenyl (abbreviation: CBP), 1,3,5-tris[4-(N-carbazolyl)phenyl]benzene (abbreviation: TCPB), 9-[4-(10-phenyl-9-anthryl)phenyl]-9H-carbazole (abbreviation: CzPA), 1,4-bis[4-(N-carbazolyl)phenyl]-2,3,5,6-tetraphenylbenzene, and the like.

Further, as aromatic hydrocarbons which can be used for the composite material, for example, there are 2-tert-butyl-9,10-di(2-naphthyl)anthracene (abbreviation: t-BuDNA), 2-tert-butyl-9,10-di(1-naphthyl)anthracene, 9,10-bis(3,5-diphenylphenyl)anthracene (abbreviation: DPPA), 2-tert-butyl-9,10-bis(4-phenylphenyl)anthracene (abbreviation: t-BuDBA), 9,10-di(2-naphthyl)anthracene (abbreviation:

DNA), 9,10-diphenylanthracene (abbreviation: DPAnth), 2-tert-butylanthracene (abbreviation: t-BuAnth), 9,10-bis(4-methyl-1-naphthyl)anthracene (abbreviation: DMNA), 2-tert-butyl-9,10-bis[2-(1-naphthyl)phenyl]anthracene, 9,10-bis[2-(1-naphthyl)phenyl]anthracene, 2,3,6,7-tetramethyl-9,10-di(1-naphthyl)anthracene, 2,3,6,7-tetramethyl-9,10-di(2-naphthyl)anthracene, 9,9'-bianthryl, 10,10'-diphenyl-9,9'-bianthryl, 10,10'-bis(2-phenylphenyl)-9,9'-bianthryl, 10,10'-bis[(2,3,4,5,6-pentaphenyl)phenyl]-9,9'-bianthryl, anthracene, tetracene, rubrene, perylene, and 2,5,8,11-tetra(tert-butyl)perylene. Alternatively, pentacene, coronene, or the like can also be used. As described above, an aromatic hydrocarbon having a hole mobility of $1 \times 10^{-6}$ cm$^2$/Vs or more and 14 to 42 carbon atoms is preferably used.

Note that an aromatic hydrocarbon which can be used for the composite material may have a vinyl skeleton. As an aromatic hydrocarbon having a vinyl group, for example, there are 4,4'-bis(2,2-diphenylvinyl)biphenyl (abbreviation: DPVBi), and 9,10-bis [4-(2,2-diphenylvinyl)phenyl]anthracene (abbreviation: DPVPA).

Alternatively, a high molecular compound such as poly(N-vinylcarbazole) (abbreviation: PVK), poly(-vinyltriphenylamine) (abbreviation: PVTPA), poly [N-(4-{N'-[4-(4-diphenylamino)phenyl]phenyl-N'-phenylamino}phenyl) methacrylamide] (abbreviation: PTPDMA), or poly[N,N'-bis(4-butylphenyl)-N,N'-bis(phenyl)benzidine (abbreviation: poly-TPD) can be used.

The hole-transporting layer 112 is a layer containing a material having a high hole-transporting property. As a substance having a high hole-transporting property, an aromatic amine compound such as 4,4'-bis[N-(1-naphthyl)-N-phenylamino]biphenyl (abbreviation: NPB), N,N'-bis(3-methylphenyl)-N,N'-diphenyl-[1,1'-biphenyl]-4,4'-diamine (abbreviation: TPD), 4,4',4"-tris(N,N-diphenylamino) triphenylamine (abbreviation: TDATA), 4,4',4"-tris[N-(3-methylphenyl)-N-phenylamino]triphenylamine (abbreviation: MTDATA), or 4,4'-bis[N-(spiro-9,9'-bifluoren-2-yl)-N-phenylamino]biphenyl (abbreviation: BSPB) can be used. Most of those substances mentioned here have a hole mobility of $1 \times 10^{-6}$ cm$^2$/Vs or more. Note that any substance other than the above substances may also be used as long as its hole-transporting property is higher than its electron-transporting property. Further, the layer containing a substance having a high hole-transporting property may be a stack of two or more layers containing any of the above substances, instead of a single layer.

Alternatively, for the hole-transporting layer 112, a high molecular compound such as poly(N-vinylcarbazole) (abbreviation: PVK) or poly(4-vinyltriphenylamine) (abbreviation: PVTPA) can also be used.

Note that the anthracene derivative described in Embodiment 1 has a hole-transporting property and therefore may be used for the hole-transporting layer.

The light-emitting layer 113 is a layer containing a light-emitting substance. In this embodiment, the light-emitting layer 113 contains the anthracene derivative described in Embodiment 1 as its main component. The anthracene derivative of the present invention exhibits blue light emission, and thus can be preferably used as a light-emitting substance for a light-emitting element.

The electron-transporting layer 114 is a layer containing a high electron-transporting property. For example, the electron-transporting layer 114 is a layer containing a metal complex having a quinoline skeleton or a benzoquinoline skeleton, such as tris(8-quinolinolato)aluminum (abbreviation: Alq), tris(4-methyl-8-quinolinolato)aluminum (abbreviation: Almq$_3$), bis(10-hydroxybenzo[h]-quinolinato)beryllium (abbreviation: BeBq$_2$), or bis(2-methyl-8-quinolinolato)(4-phenylphenolato)aluminum (abbreviation: BAlq). Alternatively, a metal complex having an oxazole-based or thiazole-based ligand, such as bis[2-(2-hydroxyphenyl)benzoxazolato]zinc (abbreviation: Zn(BOX)$_2$), or bis[2-(2-hydroxyphenyl)-benzothiazolato]zinc (abbreviation: Zn(BTZ)$_2$), or the like can be used. Further wore, as an alternative to metal complexes, 2-(4-biphenylyl)-5-(4-tert-butylphenyl)-1,3,4-oxadiazole (abbreviation: PBD), 1,3-bis[5-(p-tert-butylphenyl)-1,3,4-oxadiazol-2-yl]benzene (abbreviation: OXD-7), 3-(4-biphenylyl)-4-phenyl-5-(4-tert-butylphenyl)-1,2,4-triazole (abbreviation: TAZ), bathophenanthroline (abbreviation: BPhen), bathocuproine (abbreviation: BCP), or the like can also be used. Most of those substances mentioned here have an electron mobility of $1 \times 10^{-6}$ cm$^2$/Vs or more. Note that any substance other than the above substances may also be used for the electron-transporting layer as long as its electron-transporting property is higher than its hole-transporting property.

Note that the anthracene derivative described in Embodiment 1 has an electron-transporting property and therefore may be used for the electron-transporting layer.

Further, the electron-transporting layer is not limited to a single layer and may be a stack of two or more layers containing any of the above substances. In that case, by adding a small amount of a substance having a high electron-trapping property to a layer on a light-emitting layer side, carrier balance can be adjusted. Such a structure can have a great effect on suppressing problems (for example, a reduction in the lifetime of the element) which are caused by electrons passing through the light emitting layer.

Further, the electron-injecting layer may be provided to be in contact with the second electrode 104. For the electron-injecting layer, an alkali metal, an alkaline earth metal, or a compound thereof, such as lithium fluoride (LiF), cesium fluoride (CsF), or calcium fluoride (CaF$_2$), can be used. A layer in which an alkali metal, an alkaline earth metal, or a compound thereof is contained in a substance having an electron-transporting property, for example, a layer in which magnesium (Mg) is contained in Alq can be used. Note that by using a layer in which an alkali metal or an alkaline earth metal is contained in a substance having an electron-transporting property as the electron-injecting layer, electrons can be injected efficiently from the second electrode 104, which is preferable.

As a substance for forming the second electrode 104, a metal, an alloy, an electroconductive compound, a mixture thereof, or the like having a low work function (specifically, 3.8 eV or less) can be used. As specific examples of such cathode materials, there are elements that belong to Group 1 and Group 2 of the periodic table, that is, alkali metals such a lithium (Li) and cesium (Cs) and alkaline earth metals such as magnesium (Mg), calcium (Ca), and strontium (Sr); alloys thereof (e.g., MgAg, or AlLi); rare earth metals such as europium (Eu) and ytterbium (Yb); alloys thereof; and the like. However, by providing the electron-injecting layer between the second electrode 104 and the electron-transporting layer 114, the second electrode 104 can be formed using any of a variety of conductive materials such as Al, Ag, ITO, or indium tin oxide containing silicon or silicon oxide, regardless of its work function. A film of those conductive materials can be formed by a sputtering method, an inkjet method, a spin coating method, or the like.

Further, any of a variety of methods can be used for forming the EL layer 103, regardless of a dry method or a wet method. For example, a vacuum evaporation method, an inkjet method, a spin coating method, or the like may be used.

Further, a different film formation method may be used to form each electrode or each layer.

In particular, the light-emitting layer 113 may preferably be formed by a wet method because a favorable fim can be formed using the anthracene derivative described in Embodiment 1. When a film is formed by a wet method, a film is formed by applying a composition which contains at least the anthracene derivative described in Embodiment 1 and a solvent. The use of a wet process can increase material use efficiency, which can lead to reduction in manufacturing cost. For a wet method in which a solvent is used, it is preferable to employ a combination of materials such that a lower thin film, which has a surface on which another film is to be formed, has low solubility in the solvent.

Similarly, the electrodes may be formed by a wet method such as a sol-gel method or by a wet method using a metal paste. Further, a dry method such as a sputtering method or a vacuum evaporation method may be adopted.

In the light-emitting element of the present invention which has the structure as described above, the potential difference between the first electrode 102 and the second electrode 104 makes current flow, whereby holes and electrons recombine with each other in the light-emitting layer 113 which is a layer containing a high light-emitting property and thus light is emitted. That is, a light-emitting region is formed in the light-emitting layer 113.

Emitted light is extracted out through one or both of the first electrode 102 and the second electrode 104. Therefore, one or both of the first electrode 102 and the second electrode 104 are electrodes having a light-transmitting property. When only the first electrode 102 has a light-transmitting property, emitted light is extracted from a substrate side through the first electrode 102. Alternatively, when only the second electrode 104 has a light-transmitting property, emitted light is extracted from the side opposite to the substrate side through the second electrode 104. When the first electrode 102 and the second electrode 104 each have a light-transmitting property, emitted light is extracted from both the substrate side and the side opposite to the substrate side through the first electrode 102 and the second electrode 104.

Note that the structure of the layers provided between the first electrode 102 and the second electrode 104 is not limited to the above example. However, a structure in which a light-emitting region for recombination of holes and electrons is positioned away from the first electrode 102 and the second electrode 104 so as to prevent quenching due to the proximity of the light-emitting region and a metal used for electrodes and carrier-injecting layers is preferable. The order of stacking the layers is not limited to the above, and the following order, which is opposite to that in FIG. 1A, may be employed: the second electrode, the electron-injecting layer, the electron-transporting layer, the light-emitting layer, the hole-transporting layer, the hole-injecting layer, and the first electrode from the substrate side.

Further, the hole-transporting layer or electron-transporting layer which is in direct contact with the light-emitting layer, especially the carrier-transporting layer which is in contact with part of the light-emitting layer 113 which is closer to the light-emitting region is preferably formed including a substance having a larger energy gap than the anthracene derivative according to the present invention included in the light-emitting layer.

In this embodiment, the light-emitting element is manufactured over a substrate made of glass, plastic, or the like. By forming a plurality of such light-emitting elements over one substrate, a passive matrix light-emitting device can be manufactured. Alternatively, for example, thin film transistors (TFTs) may be formed over a substrate made of glass, plastic, or the like, and light-emitting elements may be formed over electrodes electrically connected to the TFTs. Thus, an active matrix light-emitting device that controls driving of light-emitting element by TFT can be manufactured. Note that there is no particular limitation on the structure of the TFT. Either a staggered TFT or an inverted staggered TFT may be employed. Further, there is no particular limitation on the crystallinity of a semiconductor used for the TFT, and an amorphous semiconductor may be used, or a crystalline semiconductor may be used. Further, a driving circuit formed over a TFT substrate may be formed using an n-type TFT and a p-type TFT, or may be formed using either an n-type TFT or a p-type TFT.

Since the anthracene derivative according to the present invention has a large energy gap, a light-emitting element which has sufficiently short wavelengths for blue light emission and emits blue light with high color purity can be obtained.

(Embodiment 3)

In this embodiment, a light-emitting element having a structure different from the structure described in Embodiment 2 is described.

The light-emitting layer 113 described in Embodiment 2 contains the anthracene derivative of the present invention, which is dispersed in another substance (also referred to as a host material); accordingly, light emission can be obtained from this anthracene derivative of the present invention. Since the anthracene derivative of the present invention exhibits blue light emission, a blue-light-emitting element can be obtained.

Here, various materials can be used as a host material in which the anthracene derivative of the present invention is dispersed. In addition to the substance having a high hole-transporting property and the substance having a high electron-transporting property, which are described in Embodiment 2,4,4'-di(N-carbazolyl)-biphenyl (abbreviation: CSP), 2,2',2"-(1,3,5-benzenetri-yl)tris(1-phenyl-1H-benzimidazole) (abbreviation: TPBI), 9,10-di(2-naphthyl)anthracene (abbreviation: DNA), 2-tert-butyl-9,10-di(2-naphthyl)anthracene (abbreviation: t-BuDNA), and the like are given. Note that a substance with a larger energy gap than the anthracene derivative according to the present invention is preferably used for the host material.

The light-emitting layer 113 may be a stack of two or more layers. For example, in the case where the light-emitting layer 113 is formed by stacking a first light-emitting layer and a light-emitting second layer in that order from the hole-transporting layer side, the first light-emitting layer is formed using a substance with a hole-transporting property as a host material and the second light-emitting layer is formed using a substance with an electron-transporting property as a host material.

Since the anthracene derivative according to the present invention has a large energy gap, the light-emitting element which has sufficiently short wavelengths for blue light emission and emits favorable blue light can be obtained.

Note that for the layers other than the light-emitting layer 113, the structures described in Embodiment 2 can be used as appropriate.

(Embodiment 4)

In this embodiment, a light-emitting element having a different structure from that shown in Embodiment 2 or Embodiment 3 is described.

A structure is described in which light is emitted from a substance with a light-emitting property by forming the light-emitting layer 113 of Embodiment 2 in such a manner that a substance with a light-emitting property is dispersed into the anthracene derivative of Embodiment 1; that is, a structure in which the anthracene derivative according to the present invention is used as the host material of the light-emitting layer 113.

The anthracene derivative of Embodiment 1 has a large energy gap and can effectively excite a light-emitting substance to achieve light emission; therefore, the anthracene derivative of Embodiment 1 can be suitably used as a host material and light emission derived from the light-emitting substance can be obtained.

In the case where the anthracene derivative according to the present invention is used in a light-emitting layer as a host material in which a light-emitting substance is dispersed, an emission color from the light-emitting can be obtained. Therefore, a light-emitting element can be formed which can easily provide light emission of a desired color. Accordingly, a light-emitting element which emits light with high color purity can be easily obtained.

Further, it is also possible to obtain a mixed color of a color derived from the anthracene derivative according to the present invention and a color derived from the light-emitting property substance which is dispersed in the anthracene derivative.

Here, any of a variety of materials can be used as the light-emitting substance which is dispersed in the anthracene derivative of Embodiment 1 or in a composition including at least the anthracene derivative and a solvent. As specific examples of a blue-light emitting material, N,N'-bis[4-(9H-carbazol-9-yl)phenyl]-N,N'-diphenylstilbene-4,4'-diamine (abbreviation: YGA2S), 4-(9H-carbazol-9-yl)-4'-(10-phenyl-9-anthryl)triphenylamine (abbreviation: YGAPA), N,9-diphenyl-N-[4-(10-phenyl-9-anthryl)phenyl]-9H-carbazol-3-amine (abbreviation: PCAPA), N,N''-(2-tert-butylanthracene-9,10-diyldi-4,1-phenylene)bis[N,N',N'-triphenyl-1,4-phenylenediamine] (abbreviation: DPABPA), and the like can be given. As examples of a green-light emitting material, N-(9,10-diphenyl-2-anthryl)-N,9-diphenyl-9H-carbazol-3-amine (abbreviation: 2PCAPA), N-[9,10-bis(1,1'-biphenyl-2-yl)-2-anthryl]-N,9-diphenyl-9H-carbazol-3-amine (abbreviation: 2PCABPhA), N-(9,10-diphenyl-2-anthryl)-N,N',N'-triphenyl-1,4-phenylenediamine (abbreviation: 2DPAPA), N-[9,10-bis(1,1'-biphenyl-2-yl)-2-anthryl]-N,N',N'-triphenyl-1,4-phenylenediamine (abbreviation: 2DPABPhA), 9,10-bis(1,1'-biphenyl-2-yl)-N-[4-(9H-carbazol-9-yl)phenyl]-N-phenylanthracen-2-amine (abbreviation: 2YGABPhA), N,N,9-triphenylanthracen-9-amine (abbreviation: DPhAPhA), and the like can be given. As examples of a yellow-light emitting material, rubrene, 5,12-bis(1,1'-biphenyl-4-yl)-6,11-diphenyltetracene (abbreviation: BPT), and the like can be given. As a red-light emitting material, a fluorescent material, which emits fluorescence, such as N,N,N',N'-tetrakis(4-methylphenyl)tetracene-5,11-diamine (abbreviation: p-mPhTD), or 7,13-diphenyl-N,N,N',N'-tetrakis(4-methylphenyl)acenaphtho[1,2-a]fluoranthene-3,10-diamine (abbreviation: p-mPhAFD) can be used. Alternatively, a phosphorescent substance, which emits phosphorescence, such as bis(2-phenylbenzothiazolato-N,$C^{2'}$)iridium(III)acetylacetonate (abbreviation: Ir(bt)$_2$(acac)), tris(2-phenylquinolinato-N,$C^{2'}$)iridium(III) (abbreviation: Ir(pq)$_3$), bis(2-phenylquinolinato-N,$C^{2'}$)iridium(III) (acetylacetonate) (abbreviation: Ir(pq)$_2$(acac)), bis[2-(2'-benzo[4,5-α]thienyl)pyridinato-N,$C^{3'}$]iridium(III) acetylacetonate (abbreviation: Ir(btp)$_2$(acac)), bis(1-phenylisoquinolinato-N,$C^{2'}$)iridium(III)acetylacetonate (abbreviation: Ir(piq)$_2$(acac)), (acetylacetonato)bis[2,3-bis(4-fluorophenyl)quinoxalinato]iridium(III) (abbreviation: Ir(Fdpq)$_2$(acac)), or 2,3,7,8,12,13,17,18-octaethyl-21H,23H-porphineplatinum(II) (abbreviation: PtOEP) can be used. In a case of using a phosphorescent substance as a light emitting substance which is dispersed, an emission spectrum of the phosphorescent substance preferably has a peak at 560 nm to 700 nm, inclusive. Further, in a case of using a fluorescent substance, an emission spectrum of the fluorescent substance preferably has a peak at 450 nm to 700 nm, inclusive.

As for the structure other than the light-emitting layer 113, the structure shown in Embodiment 2 can be used as appropriate.

(Embodiment 5)

In this embodiment, an embodiment of a light-emitting element with a structure in which a plurality of light-emitting units are stacked (hereinafter this type of light-emitting element is also referred to as a stacked element) is described with reference to FIG. 1B. This light-emitting element has a plurality of light-emitting units between a first electrode and a second electrode. The light-emitting unit may have a structure similar to that of the EL layer 103 described in Embodiments 2 to 4. That is, any of Embodiments 2 to 4 describes the light-emitting element having a single light-emitting unit; this embodiment describes a light-emitting element having a plurality of light-emitting units.

Figure 1B:
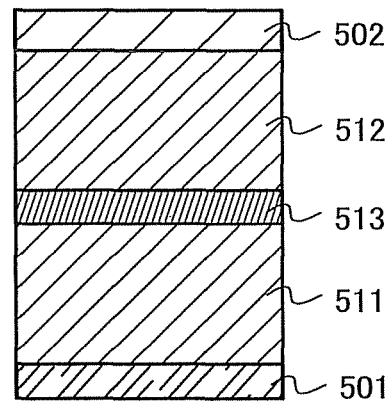

In FIG. 1B, a first light-emitting unit 511 and a second light-emitting unit 512 are stacked between a first electrode 501 and a second electrode 502. A charge generation layer 513 is provided between the first light-emitting unit 511 and the second light-emitting unit 512. The first electrode 501 and the second electrode 502 correspond to the first electrode 102 and the second electrode 104 in Embodiment 2, respectively, and electrodes similar to those described in Embodiment 2 can be used as the first electrode 501 and the second electrode 502. Further, the first light-emitting unit 511 and the second light-emitting unit 512 may have the same or different structures.

The charge generation layer 513 includes a composite material of an organic compound and a metal oxide. This composite material of an organic compound and a metal oxide is the composite material described in Embodiment 2 and includes an organic compound and a metal oxide such as vanadium oxide, molybdenum oxide, or tungsten oxide. As the organic compound, a variety of compounds such as an aromatic amine compound, a carbazole derivative, aromatic hydrocarbon, and a high molecular compound (an oligomer, a dendrimer, a polymer, or the like) can be given. An organic compound having a hole mobility of $1 \times 10^{-6}$ cm$^2$/Vs or more is preferably used as a hole-transporting organic compound. Note that any organic compound other than the above substance may also be used as long as its hole-transporting property is higher than its electron-transporting property. The composite material of an organic compound and a metal oxide is superior in a carrier-injecting property and a carrier-transporting property, so that it can achieve low-voltage driving and low-current driving.

Alternatively, the charge generation layer 513 may be formed using a layer including the composite material of an organic compound and a metal oxide in combination with a layer including another material. For example, a layer including the composite material of an organic compound and a metal oxide may be used in combination with a layer including a compound selected from an electron-donating substance and a compound with a high electron-transporting property. Further, a layer including the composite material of an organic compound and a metal oxide may be used in combination with a transparent conductive film.

In any case, any layer can be employed as the charge generation layer 513 interposed between the first light-emitting unit 511 and the second light-emitting unit 512 as long as the layer injects electrons into one of these light-emitting units and holes into the other when voltage is applied to the first electrode 501 and the second electrode 502. For example, in FIG. 1B, any layer can be employed as the charge generation layer 513 as long as the layer injects electrons into the first light-emitting unit 511 and holes into the second light-emitting unit 512 when voltage is applied so that the potential of the first electrode is higher than that of the second electrode.

Although the light-emitting element having two light-emitting units is described in this embodiment, a light-emitting element in which three or more light-emitting units are stacked can be employed in a similar way. When the charge generation layer is provided between the pair of electrodes so as to partition the plural light-emitting units like in the light-emitting element of this embodiment, the element can have a long lifetime in a high luminance region while the current density is kept low. In the case where the light-emitting element is applied to lighting, voltage drop due to resistance of an electrode material can be reduced. Accordingly, light can be unifoinfly emitted from a large area. Moreover, a light-emitting device of low power consumption, which can be driven at low voltage, can be achieved.

When light-emitting units have different emission colors from each other, light emission of a desired color can be obtained as a whole light-emitting element. For example, in the light-emitting element having two light-emitting units, when the emission color of the first light-emitting unit and the emission color of the second light-emitting unit are complementary colors, a light-emitting element emitting white light as a whole can be obtained. Note that "complementary colors" refer to colors which can produce an achromatic color when mixed. That is, white light emission can be obtained by mixture of light obtained from materials which emit light of complementary colors. In a similar manner, in a light-emitting element including three light-emitting units, white light emission can be obtained as a whole in the case where the emission color of the first light-emitting unit is red, the emission color of the second light-emitting unit is green, and the emission color of the third light-emitting unit is blue, for example.

The light-emitting element of this embodiment includes the anthracene derivative of Embodiment 1; therefore, the light-emitting unit including the anthracene derivative can provide favorable blue light or light derived from the light emission center substance with high color purity. Thus, it is easy to adjust the color emitted from the light-emitting element as a whole.

Note that this embodiment can be implemented in combination with another embodiment as appropriate.

(Embodiment 6)

This embodiment shows an example in which the anthracene derivative of Embodiment 1 is used for an active layer of a vertical transistor (SIT), which is a kind of an organic semiconductor element.

Figure 2:
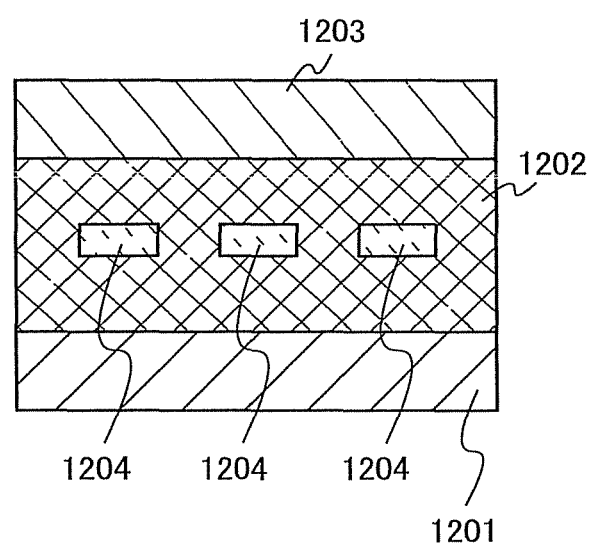
FIG. 2 is a conceptual diagram of an organic semiconductor element.

The element has a structure in which a thin active layer 1202 including the anthracene derivative according to the present invention is interposed between a source electrode 1201 and a drain electrode 1203, and a gate electrode 1204 is embedded in the active layer 1202, as illustrated in FIG. 2. The gate electrode 1204 is electrically connected to a means for applying a gate voltage, and the source electrode 1201 and the drain electrode 1203 are electrically connected to a means for controlling a source-drain voltage.

In such an element structure, when voltage is applied between the source and the drain under the condition where a gate voltage is not applied, current flows (an ON state). When a gate voltage is applied in this state, a depletion layer is generated in the vicinity of the gate electrode 1204, whereby current stops flowing (an OFF state). With the aforementioned mechanism, the element operates as a transistor.

In a vertical transistor, a material which has both a carrier-transporting property and favorable film quality is needed for an active layer like in a light-emitting element. The anthracene derivative according to the present invention is useful since it sufficiently meets those needs.

(Embodiment 7)

In this embodiment, a light-emitting device manufactured using the anthracene derivative according to the present invention is described.

In this embodiment, a light-emitting device manufactured using the anthracene derivative according to the present invention is described with reference to FIGS. 3A and 3B. FIG. 3A is a top view of the light-emitting device, and FIG. 3B is a cross-sectional view taken along lines A-A' and B-B' of FIG. 3A. This light-emitting device includes a driver circuit portion (a source side driver circuit) 601, a pixel portion 602, and a driver circuit portion (a gate side driver circuit) 603, which are indicated with dotted lines, to control the light emission of a light-emitting element. Further, reference numeral 604 denotes a sealing substrate and reference numeral 605 denotes a sealing material. A portion surrounded by the sealing material 605 is a space 607.

Reference numeral 608 denotes a wiring for transmitting signals to be input into the source side driver circuit 601 and the gate side driver circuit 603 and for receiving signals such as a video signal, a clock signal, a start signal, and a reset signal from an FPC (flexible printed circuit) 609 serving as an external input terminal. Although only the FPC is illustrated here, this FPC may be provided with a printed wiring board (PWB). The light-emitting device in this specification refers to not just a light-emitting device body but a light-emitting device provided with an FPC or a PWB.

Next, a sectional structure is described with reference to FIG. 3B. Among the driver circuit portions and the pixel portion formed over an element substrate 610, the source side driver circuit 601, which is a driver circuit portion, and one pixel in the pixel portion 602 are illustrated here.

Note that a CMOS circuit in which an n-channel TFT 623 and a p-channel TFT 624 are used in combination is formed in the source side driver circuit 601. The driver circuit may be formed by a variety of CMOS circuits, PMOS circuits, or NMOS circuits. Although the driver integrated device having the driver circuit formed over the substrate provided with the pixel portion is described in this embodiment, it is also possible to form the driver circuit not over the substrate provided with the pixel portion but outside the substrate.

Moreover, the pixel portion 602 includes a plurality of pixels including a switching TFT 611, a current control TFT 612, and a first electrode 613 electrically connected to a drain of the current control TFT 612. Note that an insulator 614 is formed covering an end of the first electrode 613. Here, a positive photosensitive acrylic resin film is used for the insulator 614.

In order to improve the coverage, the insulator 614 is formed to have a curved surface with a curvature at its upper or lower end portion. For example, in the case of using positive photosensitive acrylic for the insulator 614, only the upper end portion of the insulator 614 preferably has a curved surface with a radius of curvature (of 0.2 μm to 3 μm). Further, the insulator 614 can be formed using either negative type that becomes insoluble in an etchant by light irradiation or positive type that becomes soluble in an etchant by light irradiation.

An EL layer 616 and a second electrode 617 are formed over the first electrode 613. Here, the first electrode 613 serving as an anode is preferably formed of a material with a high work function. For example, a single-layer film of an ITO film, an indium tin oxide film containing silicon, an indium oxide film containing zinc oxide at 2 wt % to 20 wt %, a titanium nitride film, a chromium film, a tungsten film, a Zn film, a Pt film, or the like can be used. Alternatively, a stack of a titanium nitride film and a film containing aluminum as its main component, a stack of three layers of a titanium nitride film, a film containing aluminum as its main component, and a titanium nitride film, or the like can be used. Furthermore, when the first electrode 613 is fanned using a stack of layers, the resistance can be reduced as a wiring and a good ohmic contact can be obtained.

The EL layer 616 is form ed by any of a variety of methods such as an evaporation method using an evaporation mask, an inkjet method, and a spin coating method. The EL layer 616 includes the anthracene derivative according to the present invention described in Embodiment 1. As another material included in the EL layer 616, a low molecular compound or a high molecular compound (including an oligomer or a dendrimer) may be used.

As a material used for the second electrode 617, which is formed over the EL layer 616 and serves as a cathode, a material having a low work function (Al, Mg, Li, Ca, or an alloy or a compound thereof such as MgAg, MgIn, AlLi, LiF, or $CaF_2$) is preferably used. In the case where light generated in the EL layer 616 passes through the second electrode 617, the second electrode 617 is preferably formed using a stack of a thin metal film and a transparent conductive film (such as ITO, indium oxide containing zinc oxide at 2 wt % to 20 wt %, indium tin oxide containing silicon, zinc oxide (ZnO), or the like).

Note that a light-emitting element 618 is formed by the first electrode 613, the EL layer 616, and the second electrode 617. The light-emitting element 618 has any of the structures shown in Embodiment 2 to Embodiment 5. Note that the pixel portion, which includes a plurality of light-emitting elements, in the light-emitting device of this embodiment may include both the light-emitting element with any of the structures described in Embodiment 2 to Embodiment 5 and the light-emitting element with a structure other than those.

By attaching the sealing substrate 604 to the element substrate 610 using the sealing material 605, the light emitting element 618 is provided in the space 607 which is surrounded by the element substrate 610, the sealing substrate 604, and the sealing material 605. Further, the space 607 is filled with filler. The space is sometimes filled with an inert gas (such as nitrogen or argon) or the sealing material 605.

Note that an epoxy based resin is preferably used for the sealing material 605. In addition, it is desirable to use a material that allows permeation of moisture or oxygen as little as possible. As the sealing substrate 604, a plastic substrate formed from fiberglass-reinforced plastics (FRP), polyvinyl fluoride (PVF), polyester, acrylic, or the like can be used besides a glass substrate or a quartz substrate.

In this manner, the light-emitting device manufactured using the anthracene derivative of Embodiment 1 can be obtained.

Since the anthracene derivative described in Embodiment 1 is used for the light-emitting device of the present invention, the light-emitting device can have favorable characteristics. Specifically, the anthracene derivative of Embodiment 1 has a large energy gap and can provide light emission with high color purity, especially favorable blue light emission; therefore, a light-emitting device with excellent color reproducibility and high display quality can be obtained.

Figure 4A:
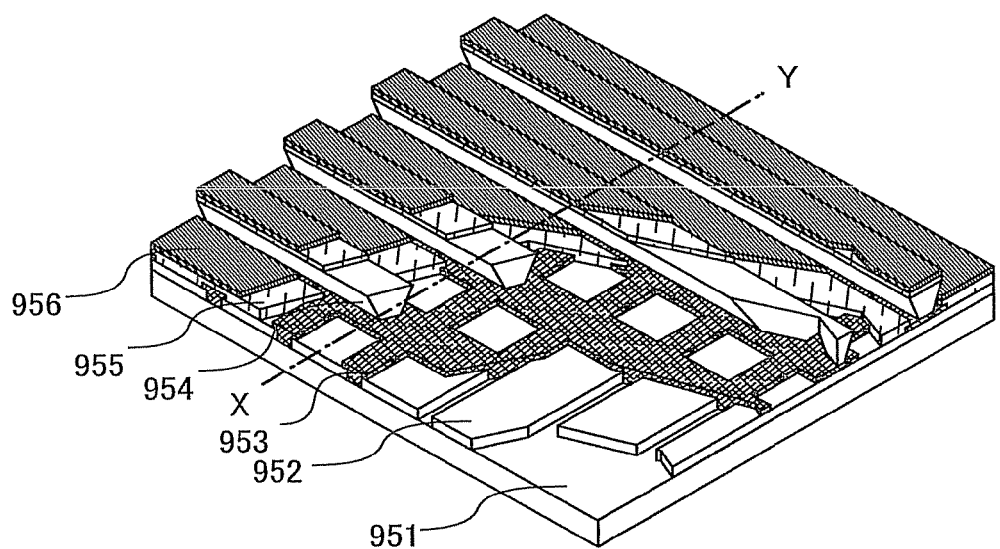
FIGS. 4A and 4B are conceptual diagrams of a passive matrix light-emitting device.
Figure 4B:
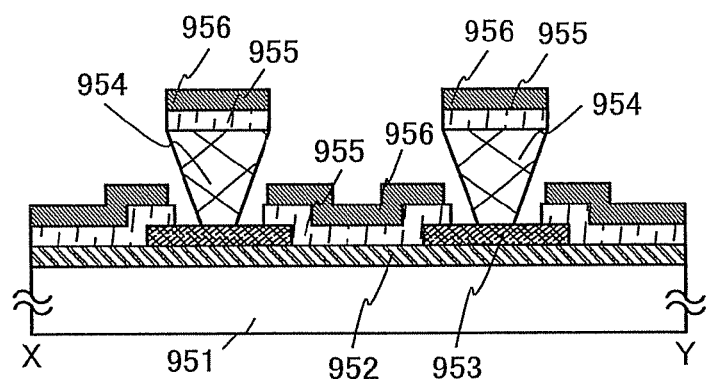

Although an active matrix light-emitting device is described in this embodiment, a passive matrix light-emitting device may alternatively be manufactured. FIGS. 4A and 4B illustrate a passive matrix light-emitting device manufactured according to the present invention. FIG. 4A is a perspective view and FIG. 4B is a cross-sectional view along line X-Y of FIG. 4A. In FIGS. 4A and 4B, an EL layer 955 is provided over a substrate 951 and between an electrode 952 and an electrode 956. An edge portion of the electrode 952 is covered with an insulating layer 953. A partition wall layer 954 is provided over the insulating layer 953. The sidewalls of the partition wall layer 954 are aslope so that the distance between the sidewalls is gradually shortened toward the surface of the substrate. That is, a cross section in a short-side direction of the partition layer 954 is a trapezoidal shape, and a bottom side (the side which faces a direction similar to a plane direction of the insulating layer 953 and is in contact with the insulating layer 953) is shorter than a top side (the side which faces a direction similar to the plane direction of the insulating layer 953 and is not in contact with the insulating layer 953). By the provision of the partition wall layer 954 in this manner, defects of the light-emitting element due to static charge or the like can be prevented. Also in the passive matrix light-emitting device, low-power-consumption drive can be achieved by the provision of the light-emitting element of the present invention which can operate at low drive voltage.

(Embodiment 8)

In this embodiment, electronic appliances of the present invention each of which includes the light-emitting device described in Embodiment 7 are described. An electronic appliance according to the present invention includes the anthracene derivative of Embodiment 1 and therefore can have a display portion with excellent color reproducibility and high display quality.

Examples of electronic appliances each manufactured using the anthracene derivative of Embodiment 1 include cameras such as video cameras or digital cameras, goggle type displays, navigation systems, audio playback devices (e.g., car audio systems and other audio systems), computers, game machines, portable information terminals (e.g., mobile computers, cellular phones, portable game machines, and electronic books), image playback devices provided with recording media (devices that are capable of playing back recording media such as digital versatile discs (DVDs) and equipped with display devices that can display the image), and the like. Some specific examples thereof are illustrated in FIGS. 5A to 5D.

Figure 5A:
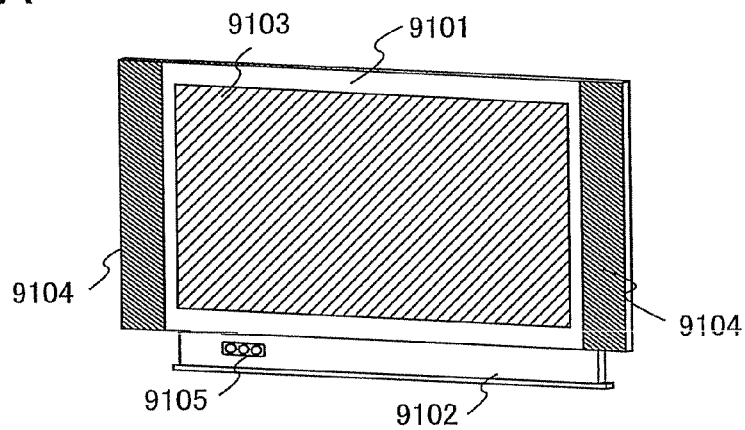
FIGS. 5A to 5D each illustrate an electronic device.

FIG. 5A illustrates a television device according to an embodiment of the present invention which includes a housing 9101, a supporting base 9102, a display portion 9103, speaker portions 9104, a video input terminal 9105, and the like. In the display portion 9103 of this television device, light-emitting elements similar to those described in any of Embodiments 2 to 5 are arranged in matrix. The light-emitting elements are capable of emitting light of favorable colors. Accordingly, the television device having the display portion 9103 including the light-emitting elements can have excellent color reproducibility and high display quality.

Figure 5B:
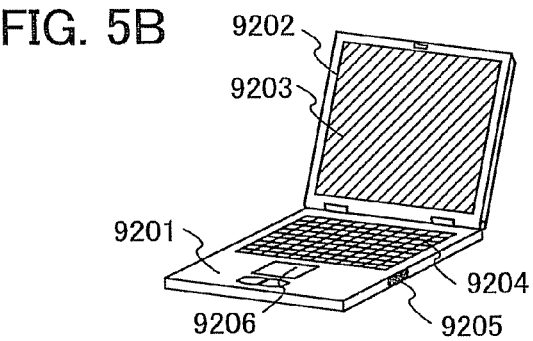

FIG. 5B illustrates a computer according to an embodiment of the present invention which includes a main body 9201, a housing 9202, a display portion 9203, a keyboard 9204, an external connection port 9205, a pointing device 9206, and the like. In the display portion 9203 of this computer, light-emitting elements similar to those described in any of Embodiments 2 to 5 are arranged in matrix. The light-emitting elements are capable of emitting light of favorable colors. Accordingly, the computer having the display portion 9203 including the light-emitting elements can have excellent color reproducibility and high display quality.

Figure 5C:
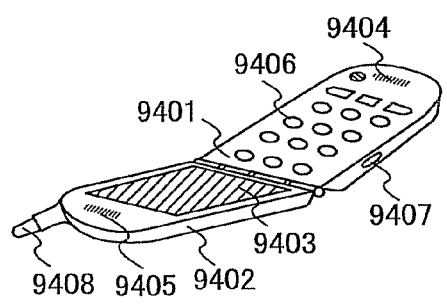

FIG. 5C illustrates a cellular phone according to an embodiment of the present invention which includes a main body 9401, a housing 9402, a display portion 9403, an audio input portion 9404, an audio output portion 9405, operation keys 9406, an external connection port 9407, an antenna 9408, and the like. In the display portion 9403 of this cellular phone, light-emitting elements similar to those described in any of Embodiments 2 to 5 are arranged in matrix. The light-emitting elements are capable of emitting light of favorable colors. Accordingly, the cellular phone having the display portion 9403 including the light-emitting elements can have excellent color reproducibility and high display quality.

Figure 5D:
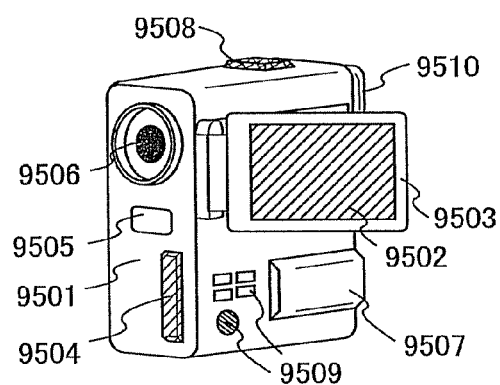

FIG. 5D illustrates a camera according to an embodiment of the present invention which includes a main body 9501, a display portion 9502, a housing 9503, an external connection port 9504, a remote control receiving portion 9505, an image receiving portion 9506, a battery 9507, an audio input portion 9508, operation keys 9509, an eye piece portion 9510, and the like. In the display portion 9502 of this camera, light-emitting elements similar to those described in any of Embodiments 2 to 5 are arranged in matrix. The light-emitting elements are capable of emitting light of favorable colors. Accordingly, the camera having the display portion 9502 including the light-emitting elements can have excellent color reproducibility and high display quality.

As set forth above, the application range of the light-emitting device described in Embodiment 7 is so wide that the light-emitting device can be applied to electronic appliances of variety of fields. By the use of the anthracene derivative of Embodiment 1, the electronic appliance having a display portion which can perform high-quality display with excellent color reproducibility can be obtained.

The light-emitting device of Embodiment 7 can also be used as a lighting device. An example in which the light-emitting device of Embodiment 7 is used as a lighting device is described with reference to FIG. 6.

Figure 6:
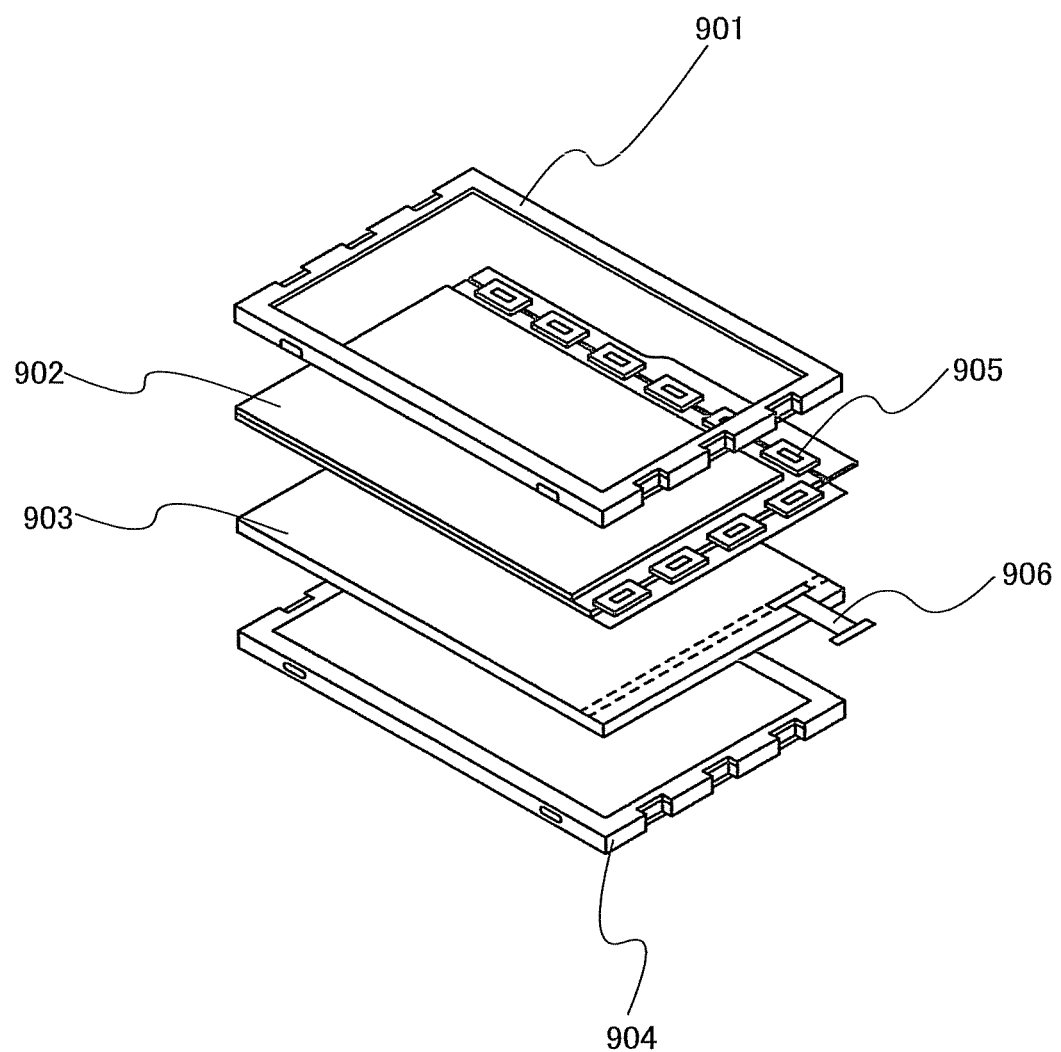
FIG. 6 illustrates an electronic device.

FIG. 6 illustrates an example of a liquid crystal display device using the light-emitting device of Embodiment 7 as a backlight. The liquid crystal display device illustrated in FIG. 6 includes a housing 901, a liquid crystal layer 902, a backlight 903, and a housing 904. The liquid crystal layer 902 is connected to a driver IC 905. The light-emitting device of Embodiment 7 is used as the backlight 903, to which current is supplied through a terminal 906.

By the use of the light-emitting device of Embodiment 7 for the backlight of the liquid crystal display device, a backlight which consumes less electric power can be obtained. Further, the light-emitting device of Embodiment 7 is a lighting device with plane light emission and can have a large area. Therefore, the backlight can have a large area, and a liquid crystal display device having a large area can be obtained. Further more, since the light-emitting device of Embodiment 7 is thin, it becomes possible to reduce the thickness of a display device.

Figure 7:
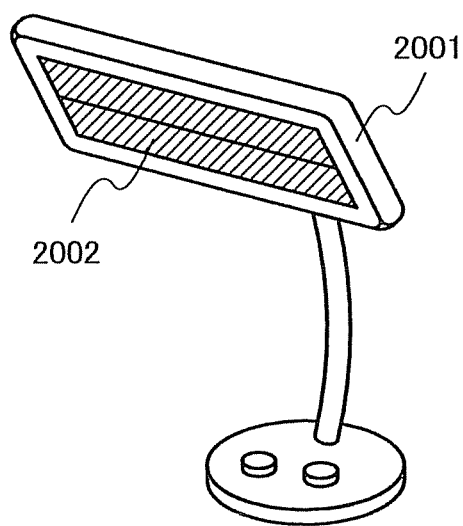
FIG. 7 illustrates a lighting device.

FIG. 7 illustrates an example in which the light-emitting device of Embodiment 7 is used as a table lamp, which is a kind of lighting device. The table lamp illustrated in FIG. 7 includes a housing 2001 and a light source 2002, and the light-emitting device of Embodiment 7 is used as the light source 2002.

Figure 8:
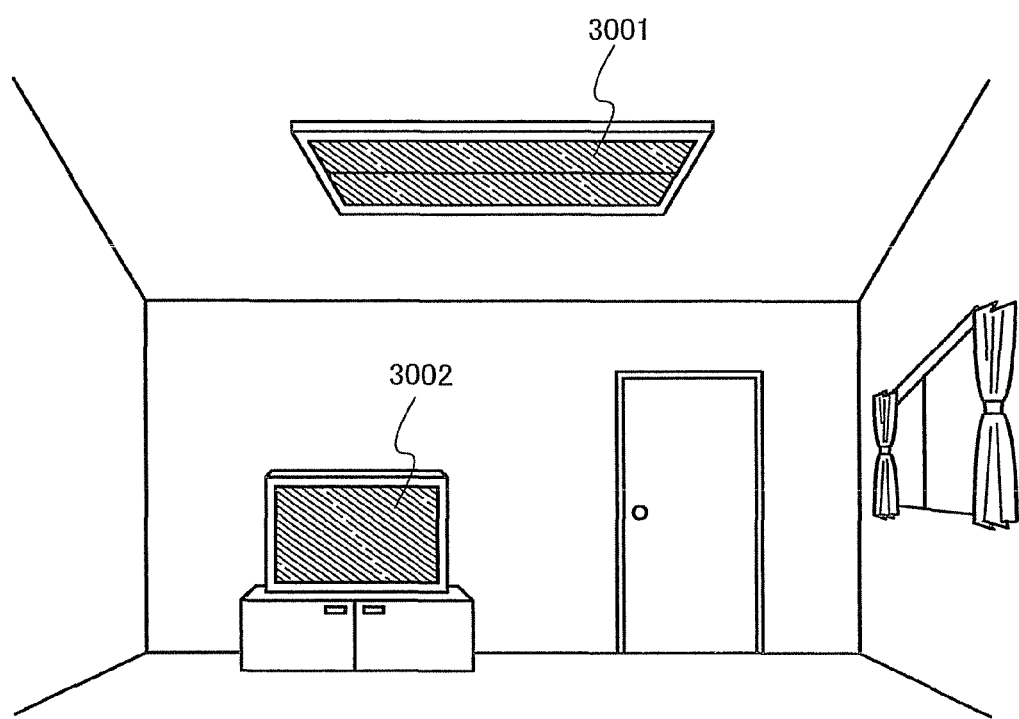
FIG. 8 illustrates lighting devices.

FIG. 8 illustrates an example in which the light-emitting device of Embodiment 7 is used as an indoor lighting device 3001. Since the light-emitting device of Embodiment 7 can have a large area, the light-emitting device can be used as a large-area lighting device. Further, since the light-emitting device of Embodiment 7 is thin, the light-emitting device of Embodiment 7 can be used as a lighting device having a reduced thickness. In a room where the light-emitting device of Embodiment 7 is used as the indoor lighting device 3001 in this manner, a television device 3002 according to the present invention, as the one illustrated in FIG. 5A, is placed so that public broadcasting and movies can be watched.

EXAMPLE 1

Example 1 describes a synthesis method for 4-(9,10-diphenyl-2-anthryl)-triphenylamine (abbreviation: 2TPPA), which is an anthracene derivative represented by the structure formula (1) in Embodiment 1.

First, a synthesis method for 2-bromo-9,10-diphenylanthracene, which is a material of 2TPPA, is described.

Step 1: Synthesis of 2-bromo-9,10-anthraquinone

Into a 1 L three-neck flask were put 46 g (206 mmol) of copper(II) bromide and 500 mL of acetonitrile, and 17.3 g (168 mmol) of tert-butyl nitrite was added thereto. While this mixture was heated at 65° C., 25 g (111 mmol) of 2-amino-9,10-anthraquinone was added to the mixture. This mixture was stirred for six hours at the same temperature. After the stirring, this reaction solution was poured into approximately 500 mL (3.0 mol/L) of hydrochloric acid and this mixture was stirred for three hours. After the stirring, the mixture including precipitate was filtered and the residue was washed with water and ethanol. After the washing, the residue was dissolved in toluene and this solution was subjected to suction filtration through Florisil (produced by Wako Pure Chemical Industries, Ltd., Catalog No. 540-00135), Celite (produced by Wako Pure Chemical Industries, Ltd., Catalog No. 531-16855), and alumina. The obtained filtrate was concentrated, so that a solid substance was obtained. The obtained solid substance was recrystallized with a mixed solution of chloroform/hexane to give 18.6 g of a light-yellow powdered solid substance, 2-bromo-9,10-anthraquinone, which was the target matter of the synthesis, in 58% yield. The synthesis scheme of Step 1 is shown in (B-1).

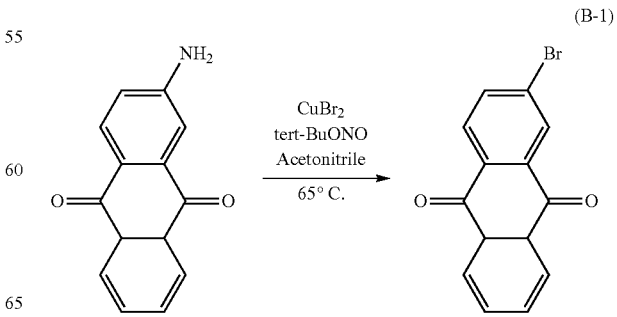

Step 2: Synthesis of 2-bromo-9,10-diphenylantracene

Into a 300 mL three-neck flask was put 4.90 g (17.0 mmol) of 2-bromo-9,10-anthraquinone, which was synthesized in Step 1, the atmosphere in the flask was substituted by nitrogen, and then 100 mL of tetrahydrofuran (THF) was added thereto. Into this solution was dropped 17.8 mL (37.3 mmol) of phenyllithium. After the drop, this solution was stirred at room temperature for 15 hours. After the stirring, the solution was washed with water and the aqueous layer was extracted with ethyl acetate. The extracted solution and the organic layer were dried with magnesium sulfate. After the mixture was dried, the mixture was subjected to gravity filtration, and the filtrate was concentrated to give 2-bromo-9,10-diphenylanthracene-9,10-diol. All of the obtained 2-bromo-9,10-diphenylanthracene-9,10-diol, 5.06 g (30.5 mmol) of potassium iodide, 9.70 g (91.5 mmol) of sodium phosphinate monohydrate, and 50 mL of glacial acetic acid were put into a 500 mL three-neck flask, and the mixture was stirred at 120° C. for 2 hours. After the stirring, 30 mL of 50% phosphinic acid was added to the mixture, and the mixture was further stirred at 120° C. for 1 hour. After the stirring, the solution was washed with water, and the aqueous layer was extracted with ethyl acetate. The extracted solution and the organic layer were dried with magnesium sulfate, subjected to gravity filtration, and then the obtained filtrate was concentrated to give a light-yellow solid substance. The solid substance was dissolved in toluene, and the solution was subjected to suction filtration through Celite (produced by Wako Pure Chemical Industries, Ltd., Catalog No. 531-16855), Florisil (produced by Wako Pure Chemical Industries, Ltd., Catalog No. 540-00135), and alumina. The obtained filtrate was concentrated to give a solid substance. The solid substance was then recrystallized with chloroform/hexane to give 5.1 g of a light-yellow powdered solid substance, 2-bromo-9,10-diphenylanthracene, which was the target matter of the synthesis, in 74% yield. The synthesis scheme of Step 2 is shown in (B-2).

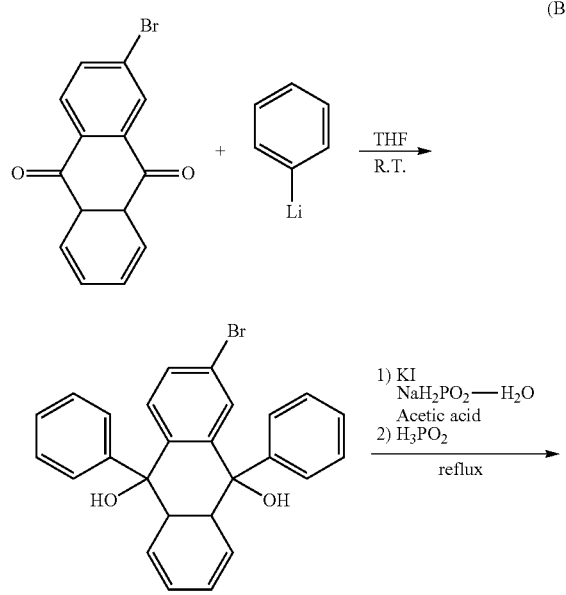

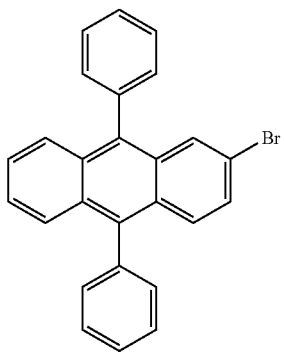

In this manner, 2-bromo-9,10-diphenylanthracene, which is the material, was synthesized. Next, the synthesis method for 4-(9,10-diphenyl-2-anthryl)-triphenylamine (abbreviation: 2TPPA), which is the anthracene derivative of Embodiment 1, is described.

Step 3: Synthesis of 4-(9,10-diphenyl-2-anthryl)-triphenylamine (abbreviation: 2TPPA Into a 100 mL three-neck flask were added 1.2 g (3.0 mmol) of 2-bromo-9,10-diphenylanthracene, which was synthesized in Step 2, 0.87 mg (3.0 mmol) of triphenylamine-4-boronic acid, and 0.15 g (0.50 mmol) of tri(ortho-tolyl)phosphine, and the atmosphere in the flask was substituted by nitrogen. To this mixture were added 10 mL of toluene, 10 mL of ethanol, and 10 mL (2.0 mol/L) of an aqueous potassium carbonate solution. This mixture was deaerated while being stirred under reduced pressure, and after the deaeration, the atmosphere in the flask was substituted by nitrogen. Then, to this mixture was added 23 mg (0.10 mmol) of palladium(II) acetate. This mixture was refluxed at 110° C. for 12 hours. After the reflux, this mixture was cooled down to room temperature and then approximately 20 mL of toluene was added to this mixture. The mixture was then filtered through Celite (produced by Wako Pure Chemical Industries, Ltd., Catalog No. 531-16855). The organic layer of the obtained mixture was washed with water and a saturated aqueous sodium chloride solution and dried with magnesium sulfate. The obtained mixture was gravity filtered. The obtained filtrate was concentrated to give a brown oily substance. This oily substance was purified by a silica gel column chromatography (a developing solvent of hexane:toluene=7:3) to give a light-yellow solid substance. The obtained light-yellow solid substance was recrystallized with ethanol to give 1.5 g of a light-yellow powdered solid substance in 86% yield. Then, 1.3 g of the obtained light-yellow powdered solid substance was sublimated and purified by a train sublimation method under conditions such that a pressure was 8.7 Pa, an argon gas flowed with a flow rate of 3.0 mL/min, and the temperature for heating 2TPPA was 270° C. After the sublimation purification, 1.0 g of a light-yellow solid substance of 2TPPA was recovered in 77% yield. The synthesis scheme of Step 3 is shown in (B-3).

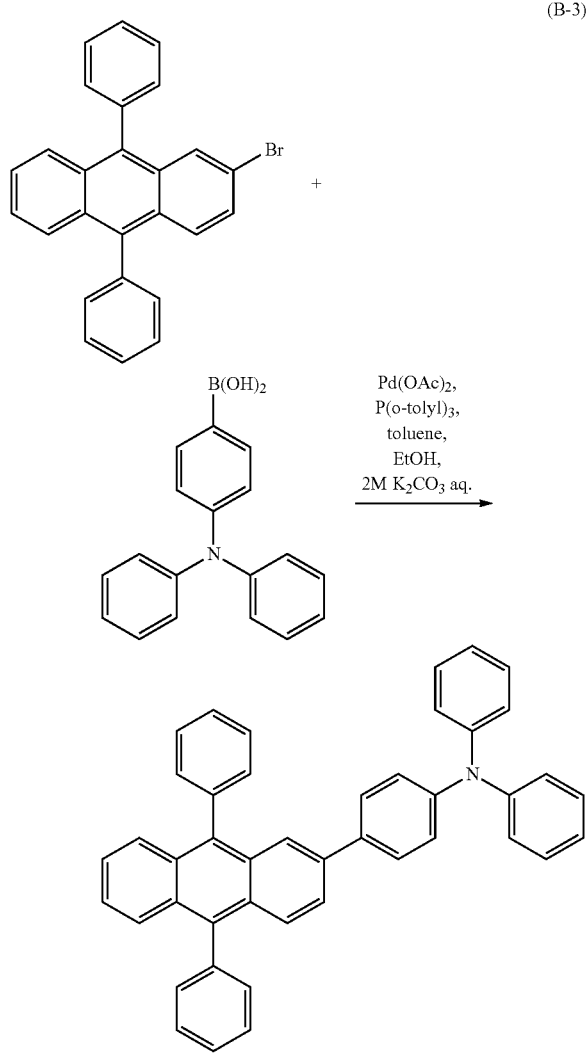

The obtained light-yellow powdered solid substance was analyzed by nuclear magnetic resonance ($^1$H NMR). Then, this light-yellow powdered solid substance was identified as 4-(9,10-diphenyl-2-anthryl)-triphenylamine (abbreviation: 2TPPA), which was the target matter of the synthesis. The measurement results are given below.

$^1$H NMR (CDCl$_3$, 300 MHz):δ=6.99-7.11 (m, 9H), 7.29-7.32 (m, 3H), 7.42 (d, J=8.7 Hz, 2H), 7.50-7.69 (m, 14H), 7.74 (d, J=9.3 Hz, 2H), 7.87 (d, J=2.1 Hz, 1H).

Figure 10A:
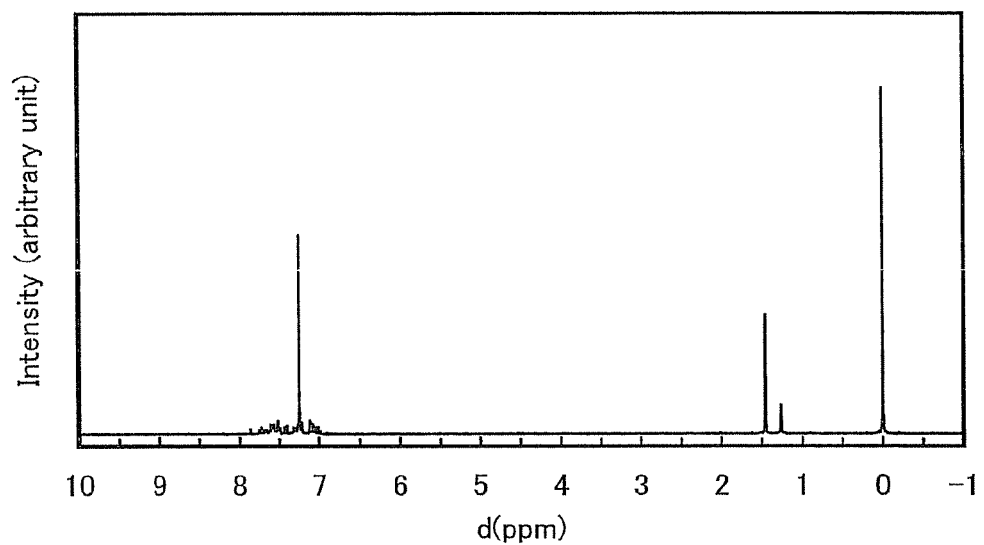
FIGS. 10A and 10B are $^1$H NMR charts of 2TPPA.
Figure 10B:
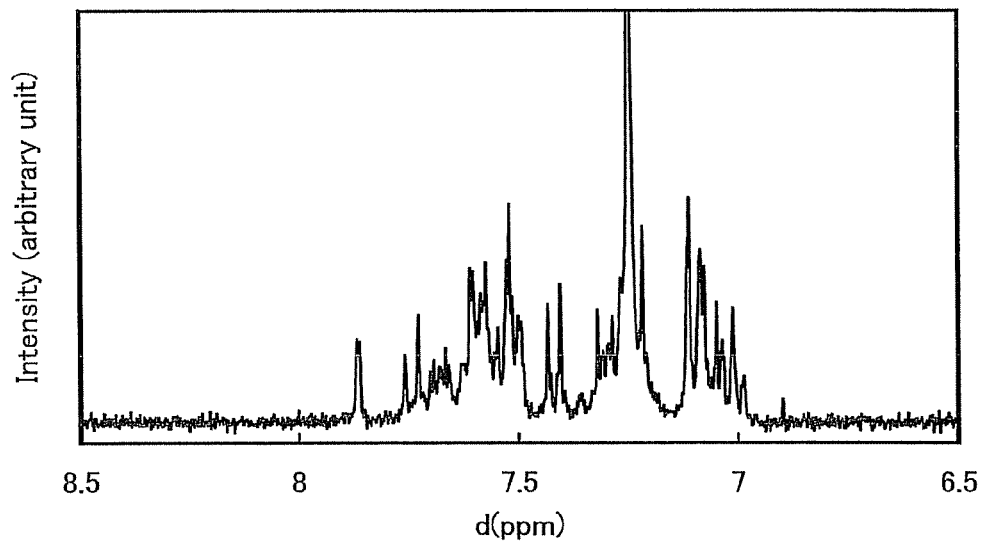

FIGS. 10A and 10B are the $^1$H NMR charts. Note that FIG. 10B is a chart showing an enlarged portion of FIG. 10A in the range of 6.5 ppm to 8.5 ppm.

Thermogravimetry-differential thermal analysis (TG-DTA) of the obtained 2TPPA was performed. The analysis was conducted using a high vacuum differential type differential thermal balance (produced by Bruker AXS K.K., TG/DTA 2410SA) under normal pressure, with a temperature-rising speed of 10° C./min, and under nitrogen stream (flow rate: 200 mL/min). It was then found from the relationship between the weight and temperature (thermogravimetry) that the 5% weight loss temperature was 394° C., which means that 2TPPA has favorable heat resistance.

Figure 11:
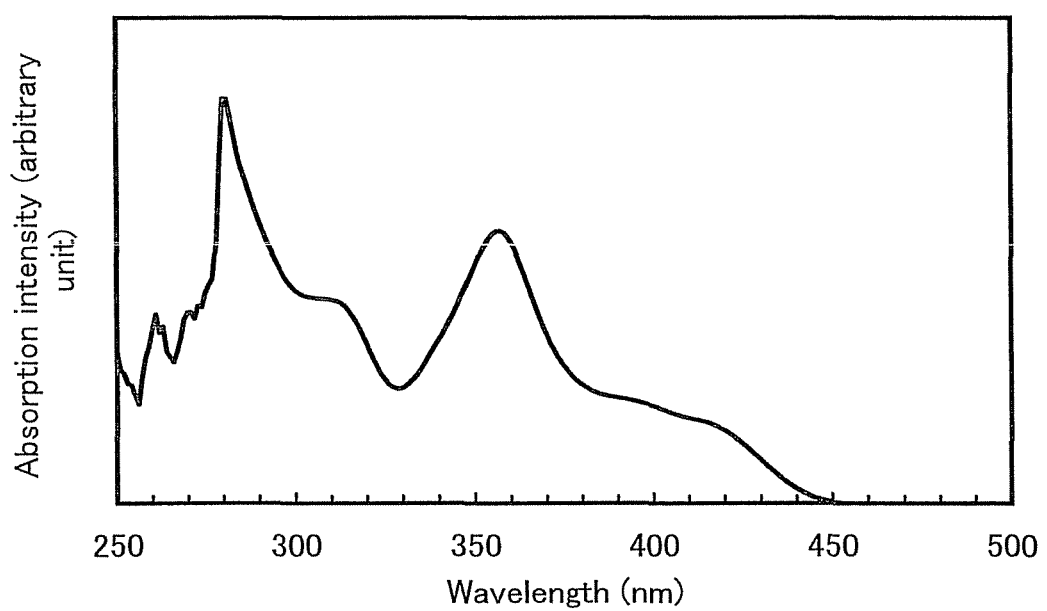
FIG. 11 shows an absorption spectrum of 2TPPA in a toluene solution.
Figure 12:
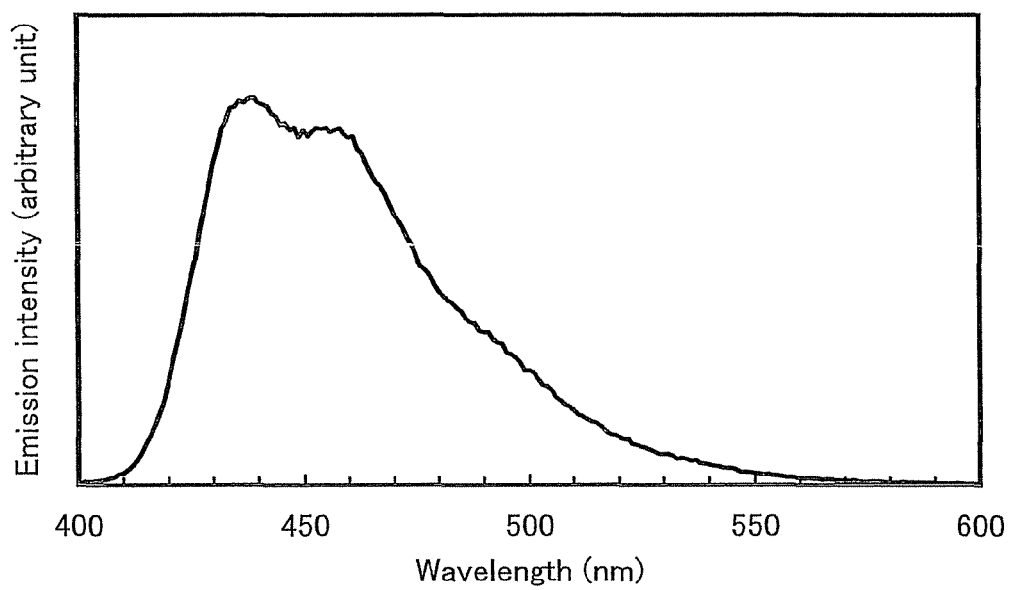
FIG. 12 shows an emission spectrum of 2TPPA in the toluene solution.

FIG. 11 shows an absorption spectrum of 2TPPA in a toluene solution and FIG. 12 shows an emission spectrum thereof. An ultraviolet-visible spectrophotometer (V-550, produced by JASCO Corporation) was used for the measurement. The solution was put in a quartz cell. The absorption spectrum of 2TPPA in the toluene solution shown in the figure was obtained by subtracting the absorption spectra of quartz and toluene from the total absorption spectrum. In FIG. 11, the horizontal axis shows wavelength (nm) and the vertical axis shows absorption intensity (arbitrary unit). In FIG. 12, the horizontal axis shows wavelength (nm) and the vertical axis shows emission intensity (arbitrary unit). In the toluene solution, the absorption was observed at around 280 nm, around 310 nm, around 355 nm, around 395 nm, and around 415 nm. The maximum emission wavelength of the solution was 459 nm (excitation wavelength: 370 nm).

Figure 13:
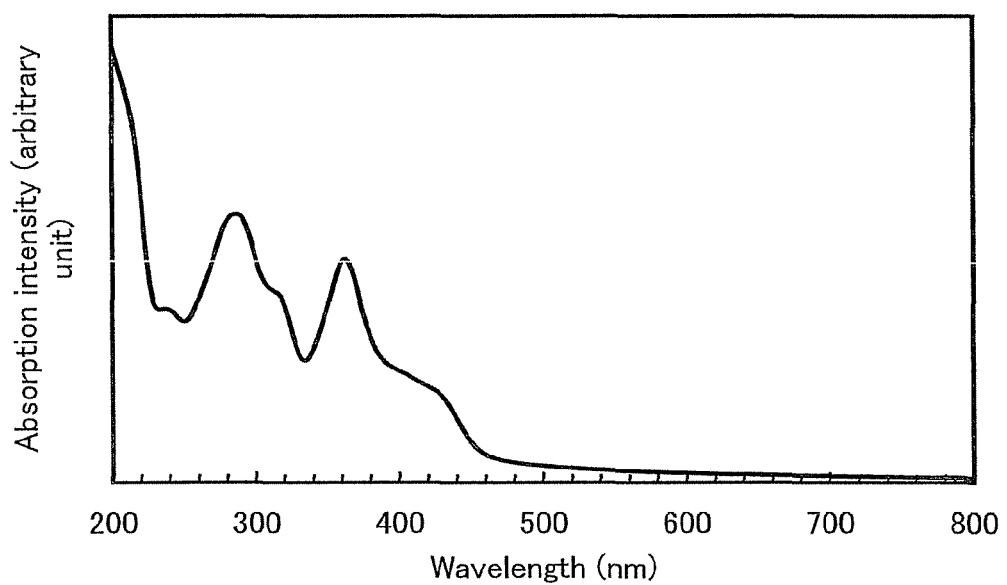
FIG. 13 shows an absorption spectrum of 2TPPA in a thin film state.
Figure 14:
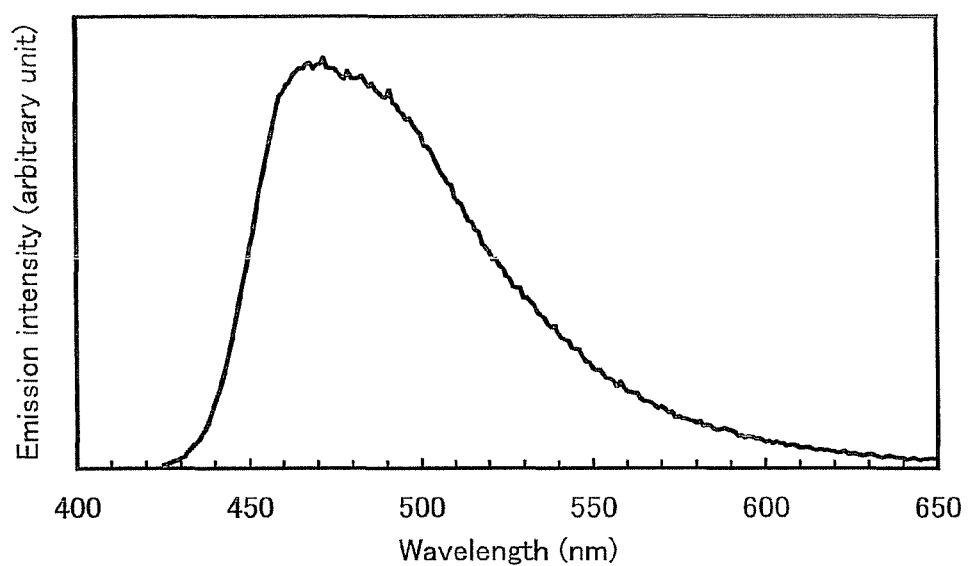
FIG. 14 shows an emission spectrum of 2TPPA in the thin film state.

FIG. 13 shows an absorption spectrum of a thin film of 2TPPA and FIG. 14 shows an emission spectrum thereof. An ultraviolet-visible spectrophotometer (V-550, produced by JASCO Corporation) was used for the measurement. A sample was manufactured by evaporation of the thin film on a quartz substrate, and the absorption spectrum from which the absorption spectrum of quartz is subtracted, is shown in the figure. In FIG. 13, the horizontal axis shows wavelength (nm) and the vertical axis shows absorption intensity (arbitrary unit). In FIG. 14, the horizontal axis shows wavelength (nm), and the vertical axis shows emission intensity (arbitrary unit). The absorption of 2TPPA in the form of the thin film was observed at around 282 nm, around 312 nm, around 359 nm, and around 426 nm. In addition, in the form of the thin film, the maximum emission wavelength was 472 nm (excitation wavelength: 410 nm). On the other hand, an emission spectrum of a thin film of the compound (c-209), which is described in Patent Document 1, has maximum emission wavelengths of 486 nm and 536 nm (excitation wavelength: 363 nm). Therefore, it is clear that 2TTPA according to the present invention emits light at shorter wavelengths than the compound (c-209) described in Patent Document 1. As seen from the above, it is also clear that the light emission of a compound in which a triarylamine skeleton is bonded to the 2-position of anthracene has a shorter wavelength and exhibits better blue light emission than a compound in which a triarylamine skeleton is bonded to each of the 2-position and the 6-position of anthracene.

Thus, it was found that both a toluene solution and a thin film of 2TPPA, which is an anthracene derivative represented by the structure formula (1) in Embodiment 1, emit excellent blue light with a sufficiently short wavelength.

Further, the oxidation reaction characteristic and reduction reaction characteristic of 2TPPA were measured. The oxidation reaction characteristic and reduction reaction characteristic were measured by cyclic voltammetry (CV). Note that an electrochemical analyzer (ALS model 600A, produced by BAS Inc.) was used for the measurement.

The solution used for the CV measurement was prepared in such a manner that a supporting electrolyte of tetra-n-butylammonium perchlorate (n-Bu$_4$NClO$_4$) (produced by Tokyo Chemical Industry Co., Ltd., catalog number: T0836) was dissolved in a solvent, which is dehydrated N,N-dimethylformamide (DMF) (produced by Sigma-Aldrich Corp., 99.8%, catalog number: 22705-6), at a concentration of 100 mmol/L and the target to be measured was further dissolved therein at a concentration of 1 mmol/L. A platinum electrode (a PIE platinum electrode, produced by BAS Inc.) was used as a working electrode. A platinum electrode (a VC-3 Pt counter electrode (5 cm), produced by BAS Inc.) was used as an auxiliary electrode. An Ag/Ag$^+$ electrode (an RE5 non-aqueous solvent type reference electrode, produced by BAS Inc.) was used as a reference electrode. The measurement was carried out at room temperature. The scan speed at the CV measurement was 0.1 V/s.

The reduction reaction characteristic of 2TPPA was examined by 100 cycles of measurements; one cycle is a scan in which the potential of the working electrode with respect to the reference electrode is changed from −1.0 V to −3.0 V and then changed from −3.0 V to −1.0 V. The oxidation reaction characteristic of 2TPPA was examined in a similar manner by 100 cycles of measurements; one cycle is a scan in which the potential of the working electrode with respect to the reference electrode is changed from −0.4 V to 0.7 V and then changed from 0.7 V to −0.4 V.

Figure 15A:
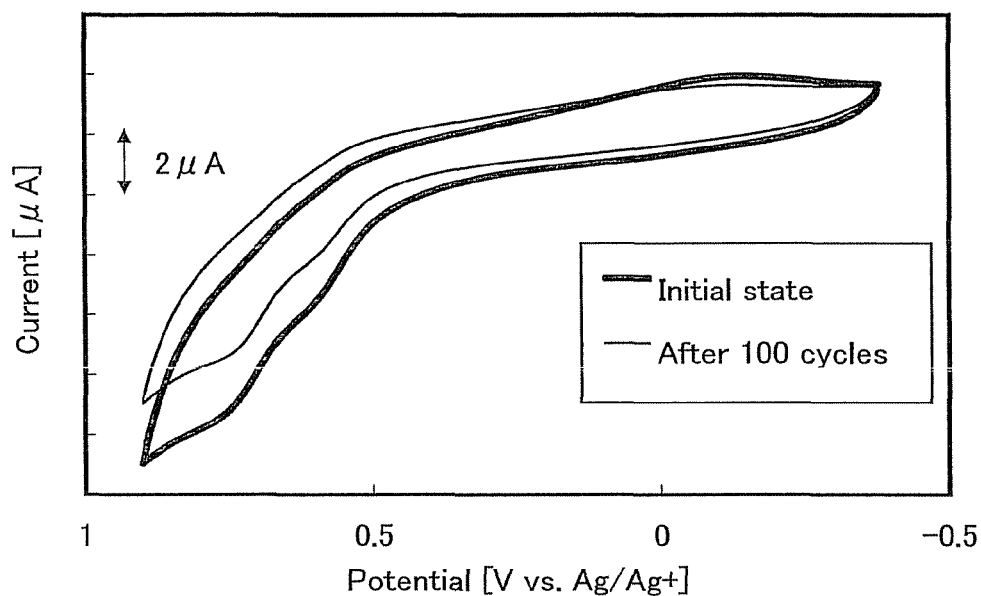
FIGS. 15A and 15B show measurement results of cyclic voltammetry of 2TPPA.
Figure 15B:
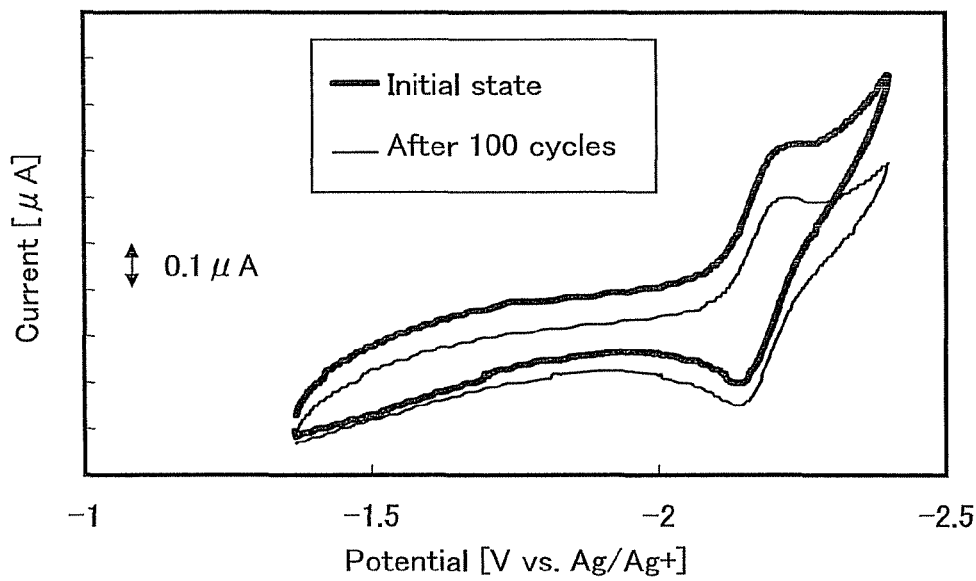

FIG. 15A shows the CV measurement result of the oxidation reaction characteristic of 2TPPA and FIG. 15B shows the CV measurement result on the reduction reaction characteristic of 2TPPA. In each of FIGS. 15A and 15B, the horizontal axis shows potential (V) of the working electrode with respect to the reference electrode, and the vertical axis shows a value (μA) of current flowing between the working electrode and the auxiliary electrode.

The current indicating oxidation is observed at around 0.6 V (vs. Ag/Ag+) in FIG. 15A and the current indicating reduction is observed at around −2.2 V (vs. Ag/Ag+) in FIG. 15B.

Although the scan was repeated as many as 100 cycles in the cyclic voltammetry, 2TPPA showed no significant change in the peak position and peak intensity of the CV curves representing the oxidation reaction and the reduction reaction. The peak intensity remained 74% of the initial state on the oxidation side and 78% of the initial state on the reduction side. Thus, it is understood that 2TPPA is relatively stable even when an oxidation reaction from a neutral state to an oxidation state and a reduction reaction from the oxidation state to the neutral state are repeated and when a reduction reaction from a neutral state to a reduction state and an oxidation reaction from the reduction state to the neutral state are repeated.

The results of measuring the thin film of 2TPPA by photoelectron spectrometry (AC-2, produced by Riken Keiki Co., Ltd.) under the atmosphere showed that the HOMO level of 2TPPA was −5.52 eV. The Tauc plot of the absorption spectrum shown in FIG. 13 revealed that the absorption edge was 2.75 eV. Therefore, the energy gap of 2TPPA is estimated to be 2.75 eV, which means that the LUMO level of 2TPPA is −2.77 eV. Thus, it is understood that 2TPPA has a large energy gap of 2.75 eV.

EXAMPLE 2

Example 2 describes a light-emitting element including the anthracene derivative of Embodiment 1 as a light emission center material.

Figure 9A:
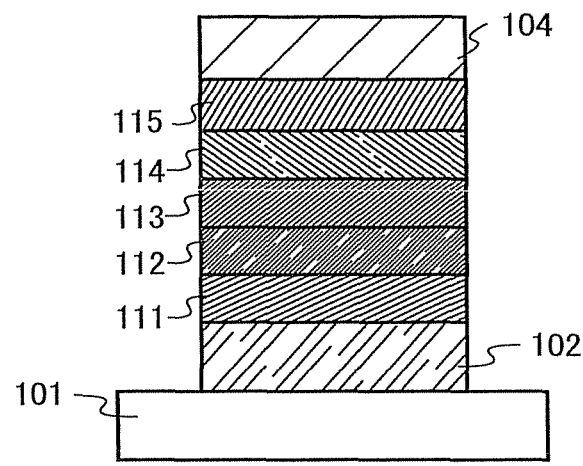
FIGS. 9A and 9B are conceptual diagrams of light-emitting elements.

Molecular structures of organic compounds (except 2TPPA) used in Example 2 are represented by the structure formulae (i), (ii), and (iii) shown below. An element structure of the light-emitting element is shown in FIG. 9A.

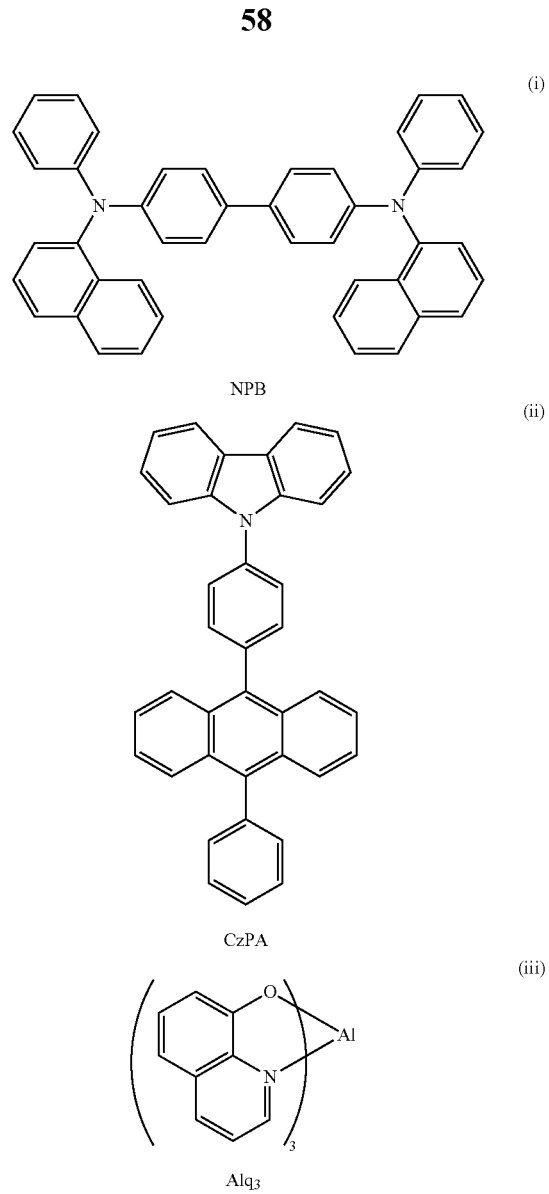

<<Fabrication of Light-Emitting Element 1>>

First, a glass substrate 101 over which indium tin oxide containing silicon (ITSO) with a thickness of 110 nm has been formed as a first electrode 102 was prepared. The periphery of a surface of the ITSO was covered with a polyimide film so that an area of 2 mm×2 mm of the surface was exposed, whereby the electrode area was 2 mm×2 mm. As pretreatment for forming the light-emitting element on the substrate 101, the surface of the substrate was washed with water and baked at 200° C. for 1 hour and then, subjected to UV ozone treatment for 370 seconds. Then, the substrate 101 was transferred into a vacuum evaporation apparatus in which the pressure was reduced to approximately 10$^{-4}$ Pa, and vacuum baking at 170° C. for 30 minutes was conducted in a heating chamber of the vacuum evaporation apparatus, and then the substrate 101 was cooled down for approximately 30 minutes.

Then, the substrate was fixed on a holder provided in the vacuum evaporation apparatus such that the surface of the substrate 101 provided with ITSO faced downward.

After the pressure in the vacuum evaporation apparatus was reduced to 10$^{-4}$ Pa, 4,4'-bis[N-(1-naphthyl)-N-phenylamino]biphenyl (abbreviation: NPB), represented by the above structure formula (i), and molybdenum(VI) oxide were co-evaporated with a mass ratio of NPB to molybdenum(VI) oxide being 4:1, whereby a hole-injecting layer 111 was formed. The thickness of the hole-injecting layer 111 was 50 nm. Note that a co-evaporation method is an evaporation method in which some different substances are evaporated from some different evaporation sources at the same time. Next, NPB was evaporated to a thickness of 10 nm as a hole-transporting layer 112.

Further, 9-[4-(10-phenyl-9-anthryl)phenyl]-9H-carbazole (abbreviation: CzPA), represented by the above structure formula (ii), and 2TPPA, synthesized in Embodiment 1, were co-evaporated with a mass ratio of CzPA to 2TPPA being 1:0.1 on the hole-transporting layer 112; thus, a light-emitting layer 113 was formed. The thickness of the light-emitting layer 113 was 30 nm.

Next, tris(8-quinolinolato)aluminum(III) (abbreviation: Alq), represented by the above structure formula (iii), was evaporated to a thickness of 10 nm, whereby an electron-transporting layer 114 was formed. Further, on the electron-transporting layer 114, Alq and lithium were co-evaporated with a mass ratio of Alq to lithium being 1:0.01, whereby an electron-injecting layer 115 was formed. The thickness of the electron-injecting layer 115 was 20 nm. Finally, a film of aluminum was formed in 200 nm thick as the second electrode 104 serving as a cathode, whereby Light-Emitting Element 1 was completed. All the above evaporation processes were performed by a resistance heating method.

Figure 16:
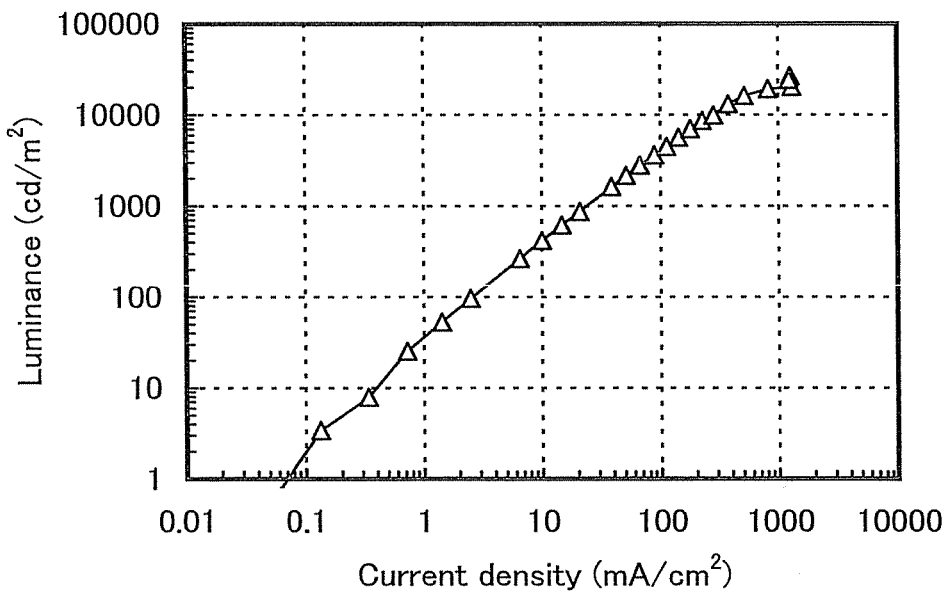
FIG. 16 shows a current density-luminance characteristic of a light-emitting element fabricated in Example 2.
Figure 17:
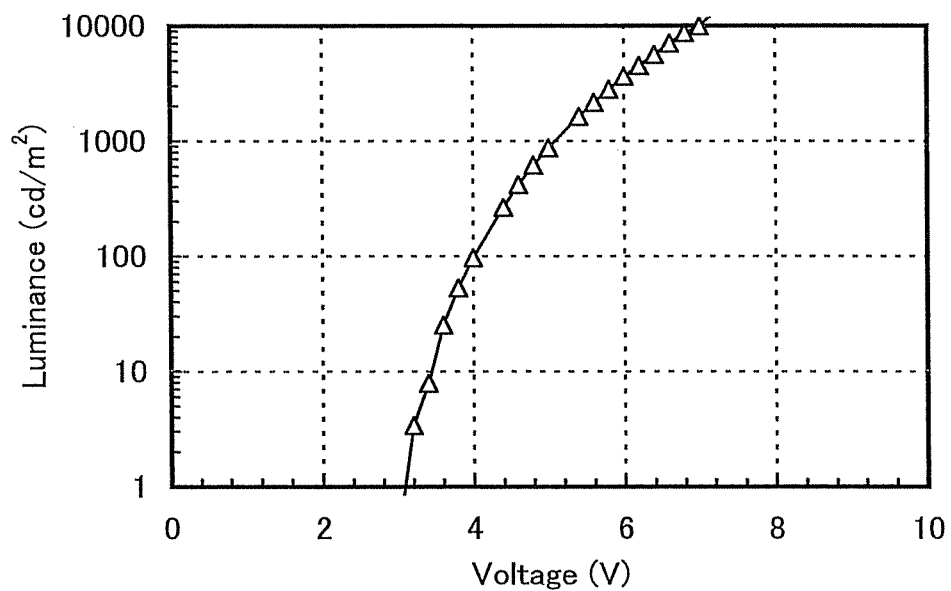
FIG. 17 shows a voltage-luminance characteristic of the light-emitting element fabricated in Example 2.
Figure 18:
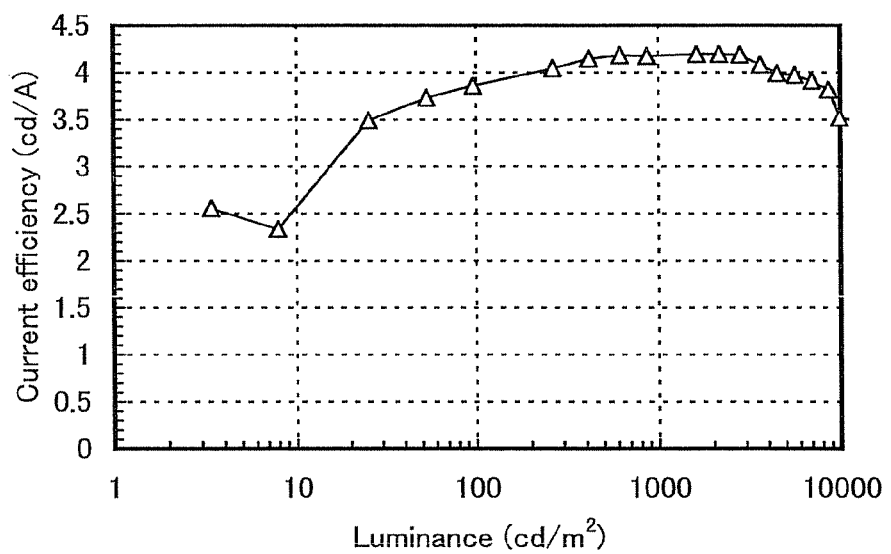
FIG. 18 shows a luminance-current density characteristic of the light-emitting element fabricated in Example 2.
Figure 19:
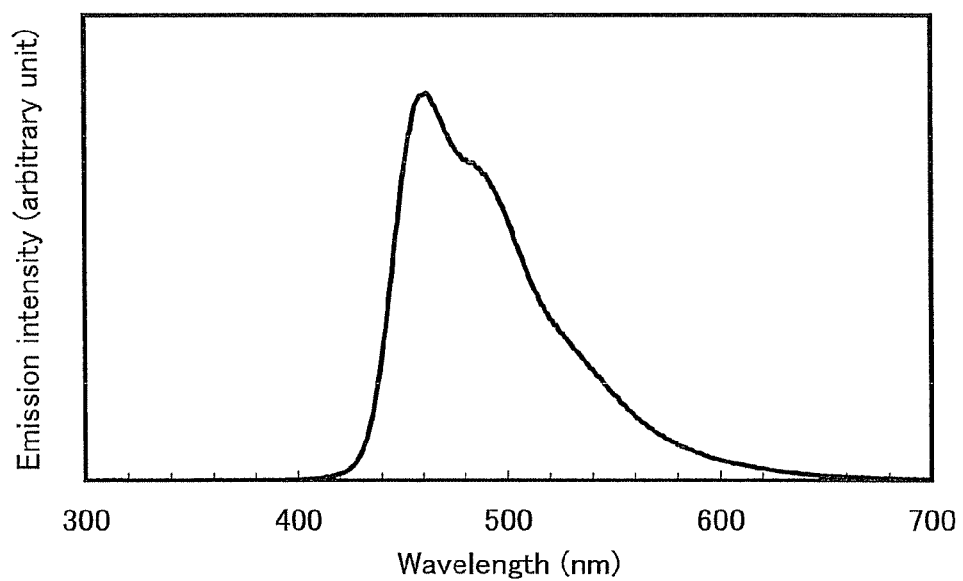
FIG. 19 shows an emission spectrum of the light-emitting element fabricated in Example 2.

FIG. 16 shows the current density-luminance characteristic of Light-Emitting Element 1, FIG. 17 shows the voltage-luminance characteristic of Light-Emitting Element 1, and FIG. 18 shows the luminance-current efficiency characteristic of Light-Emitting Element 1. FIG. 19 shows an emission spectrum when a current of 1 mA flows in the fabricated Light-Emitting Element 1. As can be seen from FIG. 19, it is confirmed that when Light-Emitting Element 1 is driven, 2TPPA emits light.

Thus, it is found that 2TPPA, which is the anthracene derivative represented by the structure formula (1) in Embodiment 1, serves as a blue-light emitting material.

As can be seen from FIG. 19, 2TPPA, which is the anthracene derivative represented by the structure formula (1) in Embodiment 1, has a large energy gap; therefore, Light-Emitting Element 1 of this example, which uses 2TPPA as a light emission center material, can emit favorable blue light having a peak at 463 nm. Light-Emitting Element 1 provided blue light emission in which the CIE chromaticity coordinates were (x=0.17, y=0.23) at a luminance of 870 cd/m². The current efficiency and external quantum efficiency of Light-Emitting Element 1 at a luminance of 870 cd/m² were 4.2 cd/A and 2.5%, respectively. At a luminance of 870 cd/m², the voltage was 5.0 V, the current density was 20.8 mA/cm², and the power efficiency was 2.6 lm/W.

Figure 20:
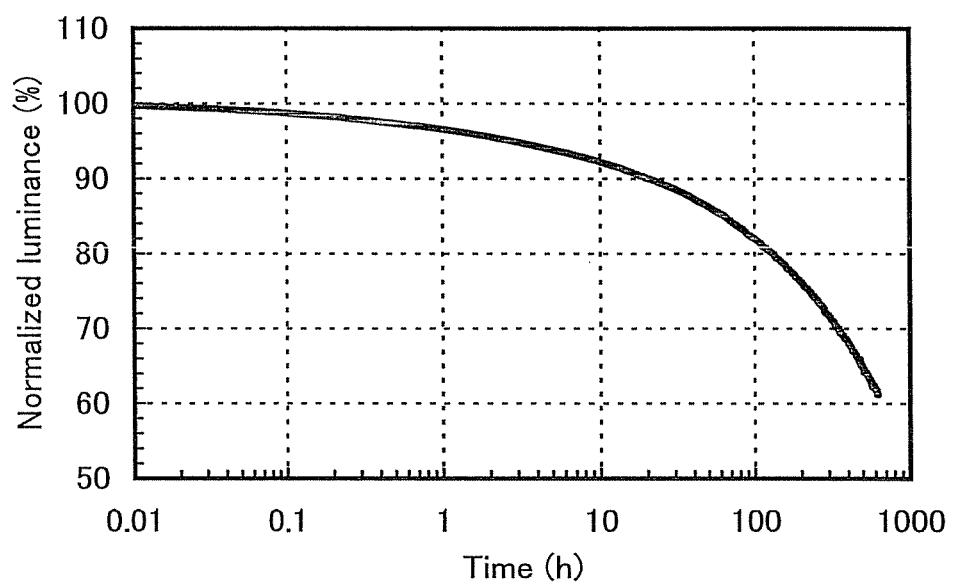
FIG. 20 shows a luminance degradation curve of the light-emitting element fabricated in Example 2.

Next, the initial luminance was set at 1000 cd/m² and this element was driven at a constant current density; the luminance degradation curve as in FIG. 20 was obtained. In FIG. 20, the horizontal axis shows time and the vertical axis shows normalized luminance (%) when the initial luminance is 100.

As seen from FIG. 20, it is found that the light-emitting element of this example has a long lifetime and deteriorates relatively less with respect to drive time.

EXAMPLE 3

Example 3 describes a light-emitting element with a different structure from the light-emitting element described in Example 2. The light-emitting element in Example 3 includes two light-emitting layers. The light-emitting layers includes the same light emission center material, the anthracene derivative of Embodiment 1, but different kinds of host materials, in which the light emission material is dispersed.

Figure 9B:
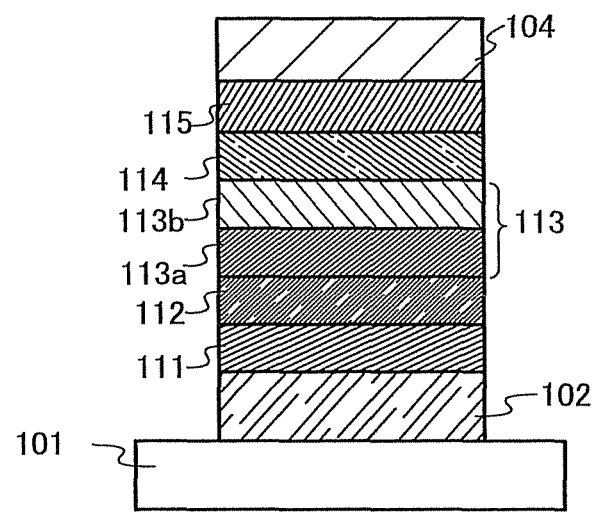

A molecular structure of an organic compound used in this example is represented by the structure formula (iv) shown below. Note that the structures of 2TPPA and the substances used in Example 1 are not described here. An element structure of the light-emitting element is shown in FIG. 9B.

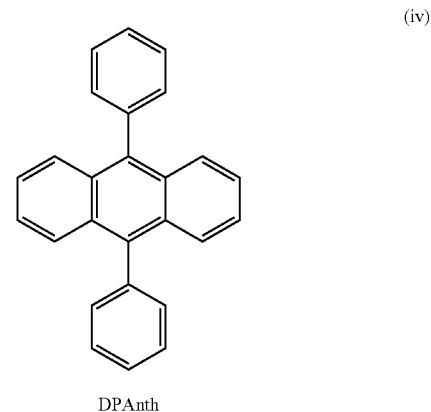 [SMILES: c1ccc(-c2c3ccccc3c(-c3ccccc3)c3ccccc23)cc1]

DPAnth

<<Fabrication of Light-Emitting Element 2>>

The process up to the step of forming the hole-transporting layer 112 was performed in a manner similar to Example 2.

Subsequently, 9,10-diphenylanthracene (abbreviation: DPAnth), represented by the above structure formula (iv), and 2TPPA, the anthracene derivative represented by the structure formula (1) in Embodiment 1, were co-evaporated with a mass ratio of DPAnth to 2TPPA being 1:0.1 on the hole-transporting layer 112, whereby a light-emitting layer 113a was formed. The film thickness of the light-emitting layer 113a was 30 nm. Subsequently, 9-[4-(10-phenyl-9-anthryl)phenyl]-9H-carbazole (abbreviation: CzPA), represented by the above structure formula (ii), and 2TPPA, the anthracene derivative represented by the structure formula (1) in Embodiment 1, were co-evaporated with a mass ratio of CzPA to 2TPPA being 1:0.1, whereby a light-emitting layer 113b was formed. The film thickness of the light-emitting layer 113b was 30 nm. Thus, the light-emitting layer 113 having a two-layer structure was formed.

Next, Alq was evaporated to a thickness of 10 nm, whereby the electron-transporting layer 114 was formed. Subsequently, Alq and lithium were co-evaporated with a mass ratio of Alq to lithium being 1:0.01, whereby the electron-injecting layer 115 was formed. The thickness of the electron-injecting layer 115 was 20 nm. Finally, aluminum was evaporated to a thickness of 200 nm as the second electrode 104 serving as a cathode, whereby Light-Emitting Element 2 was completed. All the above evaporation processes were performed by a resistance heating method.

Figure 21:
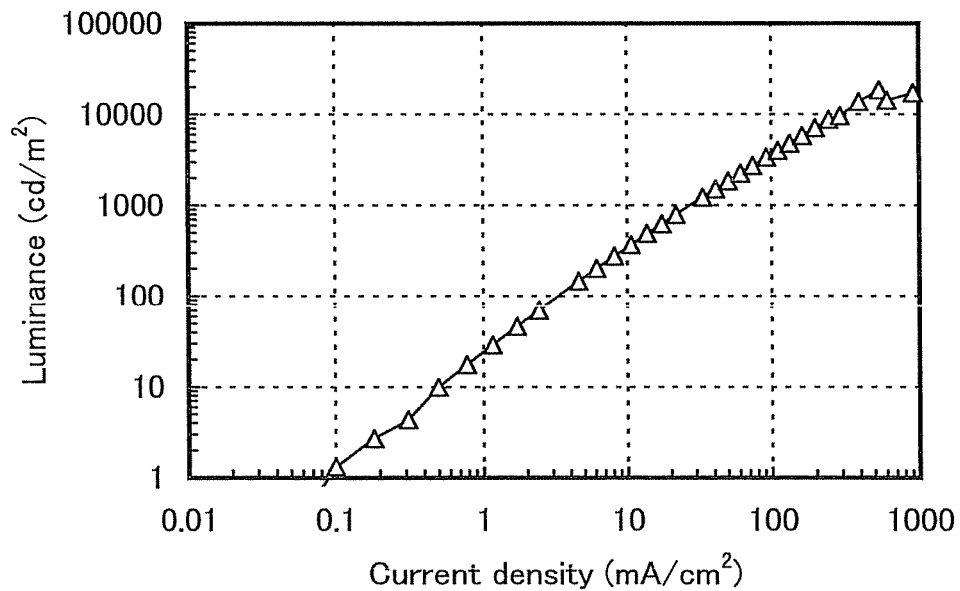
FIG. 21 shows a current density-luminance characteristic of a light-emitting element fabricated in Example 3.
Figure 22:
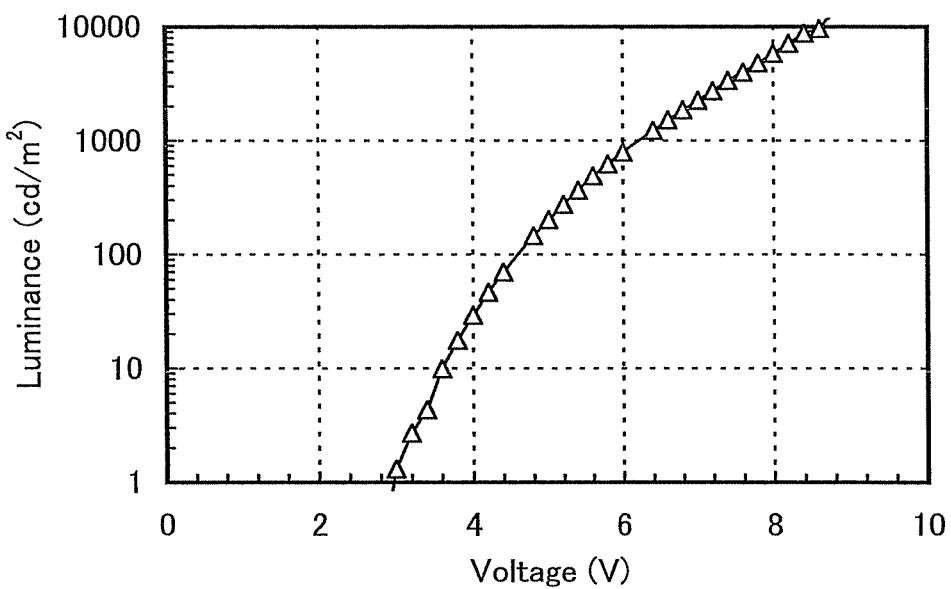
FIG. 22 shows a voltage-luminance characteristic of the light-emitting element fabricated in Example 3.
Figure 23:
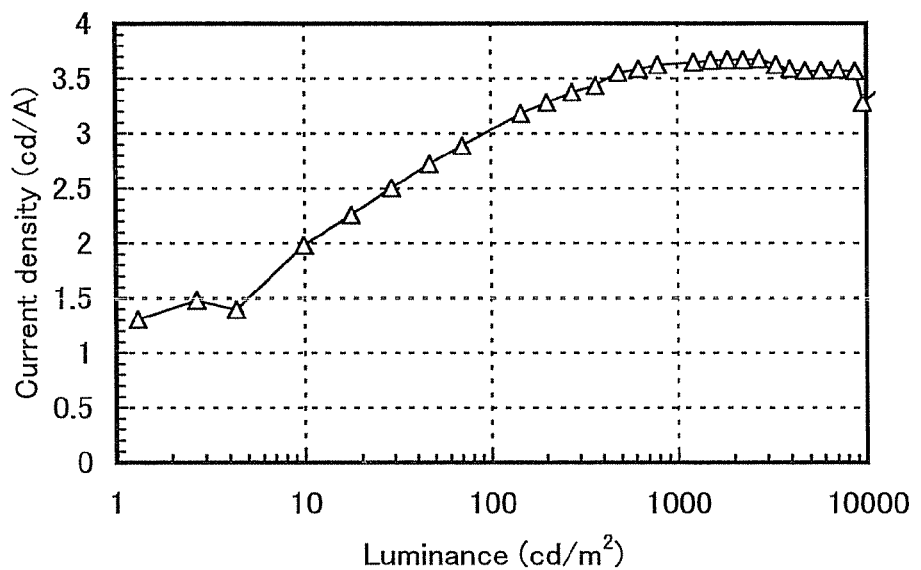
FIG. 23 shows a luminance-current density characteristic of the light-emitting element fabricated in Example 3.
Figure 24:
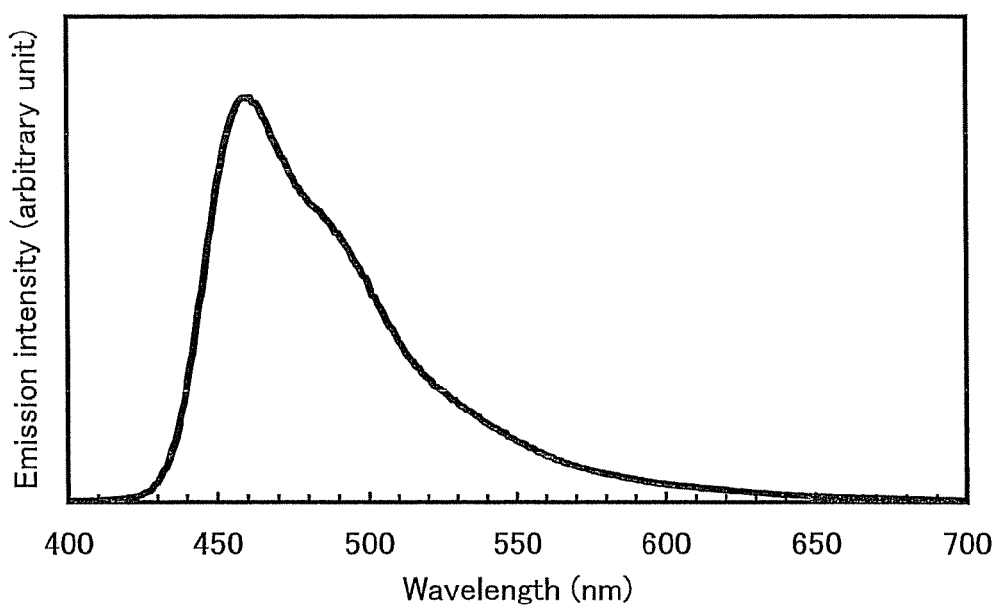
FIG. 24 shows an emission spectrum of the light-emitting element fabricated in Example 3.

FIG. 21 shows the current density-luminance characteristic of Light-Emitting Element 2, FIG. 22 shows the voltage-luminance characteristic of Light-Emitting Element 2, and FIG. 23 shows the luminance-current efficiency characteristic of Light-Emitting Element 2. FIG. 24 shows an emission spectrum when a current of 1 mA flows in the fabricated light-emitting element. As can be seen from FIG. 24, it is confirmed that when Light-Emitting Element 2 is driven, 2TPPA emits light.

Thus, it is found that 2TPPA, which is the anthracene derivative represented by the structure formula (1) in Embodiment 1, serves as a blue-light emitting material.

As can be seen from FIG. 24, 2TPPA, which is the anthracene derivative represented by the structure formula (1) in Embodiment 1, has a large energy gap; therefore, Light-Emitting Element 2 of this example, which uses 2TPPA as a light emission center material, can exhibit excellent blue light emission with a peak at 463 nm. Light-Emitting Element 2 provided favorable blue-light emission in which the CIE chromaticity coordinates were (x=0.16, y=0.20) at a luminance of 790 cd/m$^2$. The current efficiency and external quantum efficiency of Light-Emitting Element 2 at a luminance of 790 cd/m$^2$ were 3.6 cd/A and 2.5%, respectively. At a luminance of 790 cd/m$^2$, the voltage was 6.0 V, the current density was 21.8 mA/cm$^2$, and the power efficiency was 2.0 lm/W.

Figure 25:
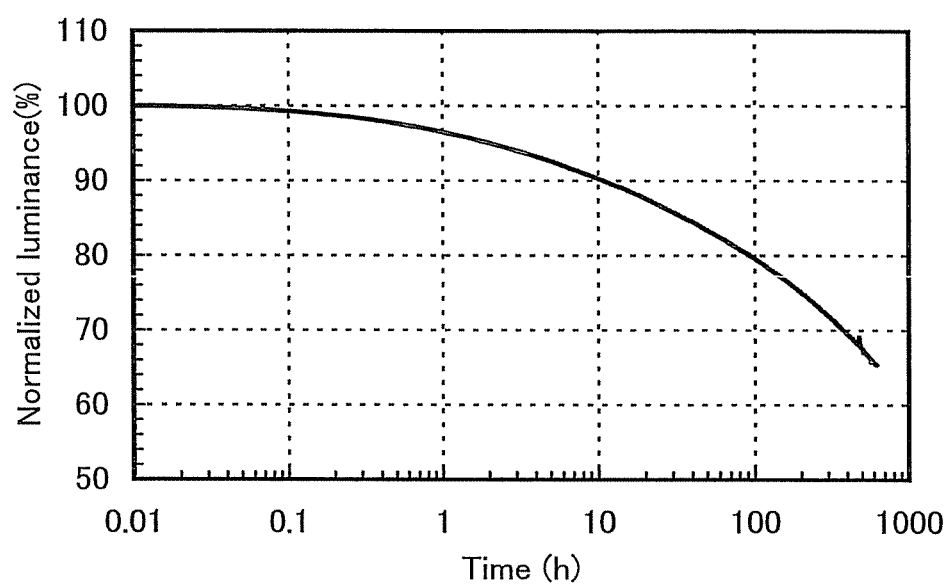
FIG. 25 shows a luminance degradation curve of the light-emitting element fabricated in Example 3.

Next, the initial luminance was set at 1000 cd/m$^2$ and this element was driven at a constant current density; the luminance degradation curve as in FIG. 25 was obtained. In FIG. 25, the horizontal axis shows time and the vertical axis shows normalized luminance (%) when the initial luminance is 100.

As seen from FIG. 25, it is found that the light-emitting element of this example has a long lifetime and deteriorates relatively less with respect to drive time.

This application is based on Japanese Patent Application serial no. 2008-114062 filed with Japan Patent Office on Apr. 24, 2008, the entire contents of which are hereby incorporated by reference.

What is claimed is:

1. An anthracene derivative comprising: an anthracene skeleton comprising a first aryl group and a second aryl group; and one triarylamine skeleton comprising a third aryl group and a fourth aryl group, wherein the anthracene skeleton is substituted with the one triarylamine skeleton at a 2-position, wherein the anthracene skeleton is substituted with hydrogen at a 6-position, wherein an arylene skeleton included in the triarylamine skeleton is one selected from group consisting of a substituted and unsubstituted arylene groups having 6 to 13 carbon atoms in a ring system, and wherein each of the third aryl group and the fourth aryl group is unsubstituted phenyl group, and wherein each of the third aryl group and the fourth aryl group is a terminal aryl group of the triarylamine skeleton and wherein each of the first aryl group and the second aryl group is directly bonded to the anthracene skeleton.

2. The anthracene derivative according to claim 1, wherein the anthracene skeleton is substituted with the first aryl group and the second aryl group at a 9-position and a 10-position, respectively.

3. The anthracene derivative according to claim 1, wherein nitrogen included in the one triarylamine skeleton is bonded to a para position of one aryl group included in the one triarylamine skeleton with respect to the anthracene skeleton.

4. The anthracene derivative according to claim 1, wherein the anthracene derivative is rotationally asymmetric.

5. The anthracene derivative according to claim 1, wherein each of the first aryl group and the second aryl group is one selected from the group consisting of a substituted and unsubstituted aryl groups having 6 to 13 carbon atoms in a ring system.

6. The anthracene derivative according to claim 5, wherein the each of the first aryl group and the second aryl group is an unsubstituted phenyl group.

7. A light-emitting device comprising:
a cathode;
an anode; and
an electroluminescent layer between the cathode and the anode,
wherein the electroluminescent layer comprises the anthracene derivative according to claim 1.

8. The light-emitting device according to claim 7, wherein the electroluminescent layer comprises a light-emitting layer, and
wherein the light-emitting layer comprises the anthracene derivative.

9. The light-emitting device according to claim 8, wherein the anthracene derivative is used in the light-emitting layer as a host material.

10. The light-emitting device according to claim 8, wherein the anthracene derivative is used in the light-emitting layer as a light emission center material.

11. An electronic appliance comprising the light-emitting device according to claim 7.

12. A lighting device comprising the light-emitting device according to claim 7.

13. The anthracene derivative according to claim 1, wherein the anthracene skeleton is substituted with hydrogen at a 1-position, 3-position, 4-position, 5-position, 7-position, and 8-position, respectively.

14. A light-emitting device comprising:
a cathode;
an anode; and
an electroluminescent layer between the cathode and the anode,
wherein the electroluminescent layer comprises the anthracene derivative according to claim 13.

* * * * *

UNITED STATES PATENT AND TRADEMARK OFFICE
CERTIFICATE OF CORRECTION

PATENT NO. : 8,741,449 B2
APPLICATION NO. : 13/491913
DATED : June 3, 2014
INVENTOR(S) : Sachiko Kawakami et al.

It is certified that error appears in the above-identified patent and that said Letters Patent is hereby corrected as shown below:

In the Specification:

Column 1, Line 19; Change "coating, light-emitting" to --coating, a light-emitting--.

Column 2, Line 32; Change "with large" to --with a large--.

Column 10, Line 52; Change "An Aryl" to --an aryl--.

Column 18, Line 9; Change "faun" to --form--.

Column 37, Line 56; Change "(G1) this" to --(G1) in this--.

Column 38, Line 24; Change "$Ar^4$" to --$Ar^5$--.

Column 38, Line 26; Change "$X^5$" to --$X^1$--.

Column 41, Lines 22 to 23; Change "poly(-vinyltriphenylamine)" to --poly(4-vinyltriphenylamine)--.

Column 42, Line 7; Change "Further wore," to --Furthermore,--.

Column 43, Lines 65 to 66; Change "one, substrate," to --one substrate,--.

Column 44, Line 37; Change "abbreviation: CSP)," to --abbreviation: CBP),--.

Column 47, Line 24; Change "unifoinfly" to --uniformly--.

Column 49, Line 16; Change "fanned" to --formed--.

Column 49, Line 19; Change "is form ed by" to --is formed by--.

Column 57, Line 2; Change "(a PIE" to --(a PTE--.

Signed and Sealed this
Fourteenth Day of October, 2014

Michelle K. Lee
*Deputy Director of the United States Patent and Trademark Office*